(12) United States Patent
Wei et al.

(10) Patent No.: US 12,436,641 B2
(45) Date of Patent: Oct. 7, 2025

(54) DISPLAY PANEL HAVING A TOUCH STRUCTURE AND DISPLAY APPARATUS

(71) Applicants: Chongqing BOE Display Technology Co., Ltd., Chongqing (CN); BOE TECHNOLOGY GROUP CO., LTD., Beijing (CN)

(72) Inventors: Chengming Wei, Beijing (CN); Hyunjin Kim, Beijing (CN); Jianhong Wang, Beijing (CN); Qian Qu, Beijing (CN); Huina Qiao, Beijing (CN); Yufeng Liu, Beijing (CN)

(73) Assignees: CHONGQING BOE DISPLAY TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/578,716

(22) PCT Filed: Jul. 29, 2022

(86) PCT No.: PCT/CN2022/109141
§ 371 (c)(1),
(2) Date: Jan. 12, 2024

(87) PCT Pub. No.: WO2024/021077
PCT Pub. Date: Feb. 1, 2024

(65) Prior Publication Data
US 2025/0103160 A1    Mar. 27, 2025

(51) Int. Cl.
G06F 3/041    (2006.01)
G06F 3/044    (2006.01)

(52) U.S. Cl.
CPC ........ *G06F 3/04164* (2019.05); *G06F 3/0445* (2019.05); *G06F 2203/04111* (2013.01)

(58) Field of Classification Search
CPC .............. G06F 3/04164; G06F 3/0445; G06F 2203/04111
See application file for complete search history.

(56) References Cited

U.S. PATENT DOCUMENTS

2012/0227259 A1    9/2012  Badaye et al.
2014/0022188 A1*   1/2014  Ahn .................... G06F 3/04164
                                                                    345/173
(Continued)

FOREIGN PATENT DOCUMENTS

CN    102985900 A    3/2013
CN    103631432 A    3/2014
(Continued)

*Primary Examiner* — David D Davis
(74) *Attorney, Agent, or Firm* — XSENSUS LLP

(57) ABSTRACT

A display panel includes a display substrate and a touch structure disposed on the display substrate. The display substrate has a display area and a non-display area and includes a plurality of connection portions located in the non-display area. The touch structure includes a plurality of first touch channels, a plurality of second touch channels, a plurality of first trace lines and a plurality of second trace lines. A first touch channel includes first touch electrodes arranged in a first direction, and a second touch channel includes second touch electrodes arranged in a second direction; the first direction is perpendicular to the second direction. The plurality of first touch electrodes in the first touch channel are connected through a first trace line; the plurality of second touch electrodes in the second touch channel are connected to a same connection portion through respective second trace lines.

19 Claims, 21 Drawing Sheets

(56) References Cited

U.S. PATENT DOCUMENTS

| | | | |
|---|---|---|---|
| 2014/0054156 A1 | 2/2014 | Chang et al. | |
| 2014/0184557 A1* | 7/2014 | Jeong | G06F 3/0443 |
| | | | 345/174 |
| 2014/0218632 A1* | 8/2014 | Pyoun | G06F 3/0445 |
| | | | 349/12 |
| 2015/0062082 A1* | 3/2015 | Pyoun | G06F 3/03545 |
| | | | 345/174 |
| 2015/0234446 A1* | 8/2015 | Nathan | G06F 3/0445 |
| | | | 345/174 |
| 2017/0277307 A1 | 9/2017 | Xu et al. | |
| 2019/0235678 A1* | 8/2019 | Kim | G06F 3/0412 |
| 2020/0012364 A1* | 1/2020 | Ye | G06F 1/1637 |
| 2021/0019007 A1* | 1/2021 | Park | G06F 3/0412 |

FOREIGN PATENT DOCUMENTS

| | | |
|---|---|---|
| CN | 104571743 A | 4/2015 |
| CN | 204347788 U | 5/2015 |
| CN | 105159485 A | 12/2015 |
| CN | 110096181 A | 8/2019 |
| CN | 112241218 A | 1/2021 |

* cited by examiner

A-A'

DISPLAY PANEL HAVING A TOUCH STRUCTURE AND DISPLAY APPARATUS

CROSS-REFERENCE TO RELATED APPLICATION

The present application is a national phase entry under 35 USC 371 of International Patent Application No. PCT/CN2022/109141, filed on Jul. 29, 2022, which is incorporated herein by reference in its entirety.

TECHNICAL FIELD

The present disclosure relates to the field of display technologies, and in particular, to a display panel and a display apparatus.

BACKGROUND

Organic light-emitting diode (OLED) panels have been widely used in the display field due to their advantages of high brightness, full viewing angle, fast response speed, flexible display and the like.

The touch recognition of existing OLED panel is mainly achieved by forming crisscrossing metal grid lines on the surface of the OLED panel as touch electrodes, and detecting capacitance changes between the vertical and horizontal touch electrodes by the touch integrated circuit (Touch IC) bonded to the OLED panel.

SUMMARY

In an aspect, a display panel is provided. The display panel includes a display substrate and a touch structure. The display substrate has a display area and a non-display area located on a periphery of the display area; the touch structure is disposed on the display substrate.

The display substrate includes a plurality of connection portions located in the non-display area.

The touch structure includes a plurality of first touch channels, a plurality of second touch channels, a plurality of first trace lines and a plurality of second trace lines; a first touch channel includes a plurality of first touch electrodes arranged in a first direction, and a second touch channel includes a plurality of second touch electrodes arranged in a second direction; the first direction is perpendicular to the second direction.

The plurality of first touch electrodes in the first touch channel are connected through a first trace line; and the plurality of second touch electrodes in the second touch channel are connected to a same connection portion through respective second trace lines.

In some embodiments, the non-display area includes a first region and a second region located on two sides of the display area in the first direction, and the plurality of connection portions are located in the first region and/or the second region. In some embodiments, the second region includes a fan-out region; the plurality of connection portions are located in the first region.

In some embodiments, the plurality of connection portions each extend in the second direction, and the plurality of connection portions are arranged side by side in the first direction.

In some embodiments, the display substrate includes a base substrate, a first metal layer, and a first insulation layer. The first metal layer is disposed between the base substrate and the touch structure, and the first insulating layer is disposed between the first metal layer and the touch structure. The plurality of connection portions are located in the first metal layer, the first insulating layer has first lapping holes exposing the plurality of connection portions, a second trace line is connected to a connection portion through a first lapping hole.

In some embodiments, the first metal layer is a source-drain metal layer in the display substrate; the first insulating layer is a planarization layer in the display substrate, and the planarization layer is located on a side of the source-drain metal layer away from the base substrate.

In some embodiments, a width of a portion of a second trace line connected to a connection portion is substantially equal to a width of the connection portion, and greater than a width of a portion of the second trace line connected to a second touch electrode.

In some embodiments, the number of the plurality of connection portions is equal to the number of the plurality of second touch channels.

In some embodiments, a connection portion includes a first connection sub-portion and a plurality of second connection sub-portions, and the first connection sub-portion is located in a different layer from the plurality of second connection sub-portions; and the plurality of second connection sub-portions are connected to the first connection sub-portion, and each second connection sub-portion is further connected to a second trace line.

In some embodiments, the first connection sub-portion is arranged in the second direction, and the second connection sub-portion is arranged in the first direction; a plurality of the first connection sub-portions of the plurality of connection portions are arranged side by side in the first direction, and second sub-connection portions of the plurality of connection portions are arranged side by side in the second direction.

In some embodiments, for the second connection sub-portion, a portion connected to the second trace line is a first portion, and a portion connected to the first sub-connection portion is a second portion; in the first direction, the first portion is further away from the display area than the second portion.

In some embodiments, a plurality of first portions of the plurality of connection portions are aligned in the first direction.

In some embodiments, the display substrate further includes a base substrate and a thin film encapsulation layer located on the base substrate; the touch structure is disposed on a side of the thin film encapsulation layer away from the base substrate; a portion of the second connection sub-portion connected to the second trace line is a first portion; for orthographic projections on the base substrate, at least one first connection sub-portion overlaps the thin film encapsulation layer, and first portions of the plurality of connection portions are non-overlapping with the thin film encapsulation layer.

In some embodiments, the display substrate includes a base substrate, and a first metal layer, a first insulation layer, a second metal layer and a second insulation layer that are stacked between the base substrate and the touch structure.

The first connection sub-portion is located in the first metal layer, and the second connection sub-portions are located in the second metal layer; the first insulating layer has first lapping holes exposing the first connection sub-portion, and the second insulating layer has second lapping holes exposing the second connection sub-portions; the second connection sub-portion is connected to the first connection sub-portion through a first lapping hole, and the second trace line is connected to the second connection sub-portion through a second lapping hole.

In some embodiments, the display substrate includes a gate metal layer, a first source-drain metal layer, and a second source-drain metal layer; the first metal layer and the second layer are ant two of the gate metal layer, the first source-drain metal layer, and the second source-drain metal layer.

In some embodiments, a width of the first connection sub-portion is substantially equal to a width of the second connection sub-portion; a width of a portion of the second trace line connected to the second connection sub-portion is substantially equal to the width of the second connection sub-portion, and is greater than a width of a portion of the second trace line connected to a second touch electrode.

In some embodiments, the number of the plurality of connection portions is the same as the number of the plurality of second touch channels; the number of second connection sub-portions in a connection portion is equal to the number of second touch electrodes in a corresponding second touch channel.

In some embodiments, the non-display area includes a fan-out region and a bonding region, and the bonding region is farther away from the display area than the fan-out region. An end of the first trace line is connected to the first touch channel, and another end extends to the bonding region through the fan-out region. The touch structure further includes a plurality of third trace lines, an end of the third trace line is connected to a connecting portion, and another end extends to the bonding region through the fan-out region.

In some embodiments, the connection portion includes a first connection sub-portion and a plurality of second connection sub-portions, and the first connection sub-portion is located in a different layer from the plurality of second connection sub-portions, the plurality of second connection sub-portions are all connected to the first connection sub-portion; each second connection sub-portion is further connected to a second trace line, the connection portion further includes a third connection sub-portion connected to the first connection sub-portion, and the third connection sub-portion is located in a different layer from the first connection sub-portion; and each third connection sub-portion is further connected to a third trace line.

In some embodiments, for the third connection sub-portion, a portion connected to the third trace line is a third portion, and a portion connected to the first connection sub-portion is a fourth portion; in the first direction, the third portion is farther from the display area than the fourth portion.

In some embodiments of the present disclosure, the display substrate includes a base substrate and a thin film encapsulation layer located on the base substrate; the touch structure is disposed on a side of the thin film encapsulation layer away from the base substrate. For orthographic projections on the base substrate, at least one first connection sub-portion overlaps with the thin film encapsulation layer, and third portions of the plurality of connection portions are all non-overlapping with the thin film encapsulation layer.

In some embodiments, the plurality of first touch channels, the plurality of second touch channels, the plurality of first trace lines, the plurality of second trace lines and the plurality of third trace lines are arranged in a same layer.

In some embodiments, the touch structure includes a touch device layer and a touch protective layer, and the touch device layer includes the plurality of first touch channels, the plurality of second touch channels, the plurality of first trace lines, the plurality of second trace lines that are located in a same layer; the touch protective layer is further away from the display substrate than the touch device layer.

In some embodiments, the touch structure includes a plurality of first line groups, the number of the first line groups is equal to the number of the connection portions, each first line group includes second trace lines, and a plurality of second touch electrodes connected to the second trace lines belong to a same second touch channel.

In some embodiments, a first touch electrode and a second touch electrode are arranged in pairs; second touch electrodes paired with the plurality of first touch electrodes in the first touch channel are arranged into a first electrode group; the second touch electrodes in the first electrode group are located in a same side of the corresponding first touch channel.

In some embodiments, the touch structure includes a plurality of second trace groups, each second trace group includes second trace lines, and second touch electrodes connected to the second trace lines belong to a same first electrode group; the second trace lines in the second trace group are arranged on a same side of the first electrode group.

In some embodiments, the first touch channel and the first electrode group that are arranged in pairs are arranged into a second electrode group; a first trace line and second trace lines that are connected to the second electrode group are respectively located on two sides of the second electrode group.

In some embodiments, the touch structure includes first touch channels and first electrode groups; with respect to a center line of symmetry parallel to the first direction, the first touch channels are arranged symmetrically, and the first electrode groups are arranged symmetrically.

In some embodiments, shapes of the first touch electrodes and the second touch electrodes are each circular, triangular, rectangular, square, rhombus, interdigitated, or Y-shaped.

In another aspect, a display apparatus is provided. The display apparatus includes the display panel as described in any one of the above embodiments.

BRIEF DESCRIPTION OF THE DRAWINGS

In order to describe technical solutions in the present disclosure more clearly, the accompanying drawings to be used in some embodiments of the present disclosure will be introduced briefly. Obviously, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1:
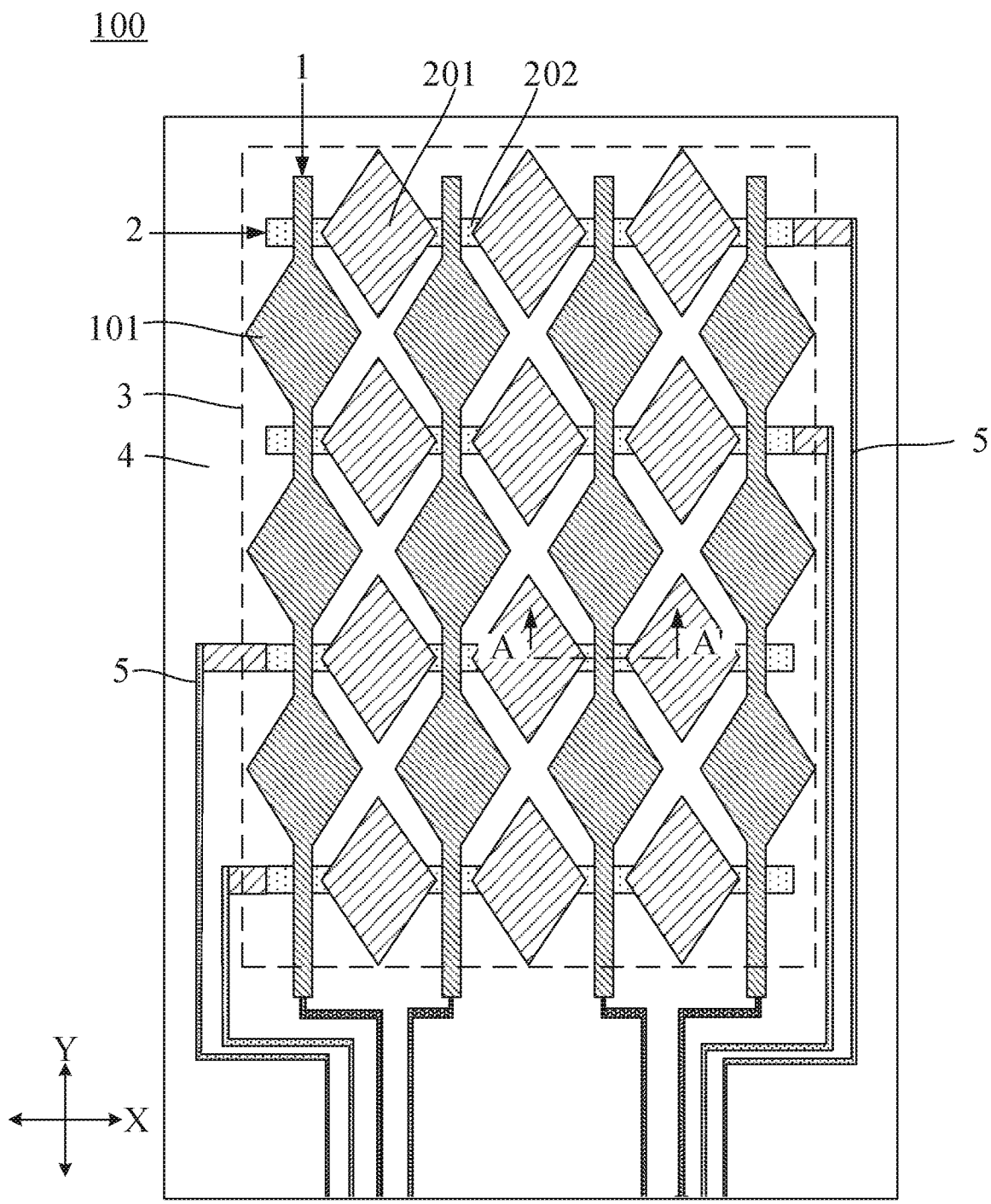
FIG. 1 is a top view of a touch structure in accordance with the related art.

The technical solutions in some embodiments of the present disclosure will be described clearly and completely with reference to the accompanying drawings; however, the described embodiments are merely some but not all embodiments of the present disclosure. All other embodiments obtained by a person of ordinary skill in the art based on embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example", or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

The terms "first" and "second" are used for descriptive purposes only, and are not to be construed as indicating or implying a relative importance or implicitly indicating a number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the expressions "coupled," "connected," and derivatives thereof may be used. For example, the term "connected" may be used in the description of some embodiments to indicate that two or more elements are in direct physical or electrical contact with each other. For another example, the term "coupled" may be used in the description of some embodiments to indicate that two or more elements are in direct physical or electrical contact. However, the term "coupled" or "communicatively coupled" may also mean that two or more elements are not in direct contact with each other, but still cooperate or interact with each other. The embodiments disclosed herein are not necessarily limited to the contents herein.

The phrase "at least one of A, B, and C" has the same meaning as the phrase "at least one of A, B, or C", both including the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

As used herein, the term "if" is, optionally, construed as "when" or "in a case where" or "in response to determining that" or "in response to detecting", depending on the context. Similarly, depending on the context, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]".

The use of the phrase "applicable to" or "configured to" herein means an open and inclusive expression, which does not exclude devices that are applicable to or configured to perform additional tasks or steps.

Additionally, the use of the phase "based on" is meant to be open and inclusive, since a process, step, calculation or other action that is "based on" one or more of the stated conditions or values may, in practice, be based on additional conditions or value beyond those stated.

The term such as "about", "substantially", and "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

The term such as "parallel," "perpendicular," or "equal" as used herein includes a stated condition and a condition similar to the stated condition. A range of the similar condition is within an acceptable deviation range, and the acceptable deviation range is determined by a person of ordinary skill in the art, considering measurement in question and errors associated with measurement of a particular quantity (i.e., the limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°; and the term "equal" includes absolute equality and approximate equality, and an acceptable range of deviation of the approximate equality may be, for example, that a difference between two equals is less than or equal to 5% of either of the two equals.

It will be understood that, when a layer or element is referred to as being on another layer or substrate, it may be that the layer or element is directly on the another layer or substrate, or it may be that intervening layer(s) exist between the layer or element and the another layer or substrate.

Exemplary embodiments are described herein with reference to sectional views and/or plan views that are schematic illustrations of idealized embodiments. In the accompanying drawings, thickness of layers and regions may be exaggerated for clarity. Thus, variations in shape with respect to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

Some display panels each include a display substrate and a touch structure; the display substrate is configured to implement the display function of the display panel, and the touch structure is configured to implement the touch detection function of the display panel, so that the display panel has both display and touch functions.

The display substrate in the display panel may be encapsulated by using a thin film encapsulation (TFE) layer. For the thin film encapsulated display substrate, the touch structure may adopt a flexible multi-layer on cell (FMLOC) design; here, the FMLOC design refers to forming the touch device of the touch structure outside the thin film encapsulation layer of the display substrate, i.e., integrating the touch structure and the display substrate 200. Thus, there is no need to provide an external touch panel (TSP), and the display panel has advantages such as thinness, and foldable design, which may meet the needs of products such as flexible folding and narrow bezel.

FIG. 1 is a top view of a touch structure according to the related art. As shown in FIG. 1, in the related art, the touch structure 100 with the FMLOC design includes a touch area 3 and a touch peripheral area 4 located on a periphery of the touch area 3; the touch area 3 is an area in the touch structure 100 that implements the touch detection function. The touch structure 100 includes a plurality of first touch electrodes 101 and a plurality of second touch electrodes 201 that are arranged in an array in the touch area 3, and the plurality of first touch electrodes 101 and the plurality of second touch electrodes 201 are arranged in the same layer. Two adjacent first touch electrode 101 and second touch electrode 201 may be coupled to each other to form mutual capacitance to form a mutual capacitance touch device.

With continued reference to FIG. 1, the plurality of first touch electrodes 101 in the touch area 3 are arranged to form a plurality of first touch channels 1 each extending in a first direction Y, the plurality of first touch channels 1 extend in a second direction X, and each first touch channel 1 includes first touch electrodes 101 arranged in the first direction Y.

The plurality of second touch electrodes 201 in the touch area 3 are arranged to form a plurality of second touch channels 2 each extending in the second direction X, the plurality of second touch channels 2 are arranged in the first direction Y, and each second touch channel 2 includes second touch electrodes 201 arranged in the second direction X. The first direction Y and the second direction X are perpendicular to each other, and the plurality of first touch channels 1 and the plurality of second touch channels 2 are arranged perpendicularly and crosswise.

In a same first touch channel 1, two adjacent first touch electrodes 101 are directly connected, thereby forming a touch channel conductive in the first direction Y.

The second touch electrodes 201 in the second touch channel 2 and the first touch electrodes 101 in the first touch channel 1 are arranged in the same layer. Thus, in an intersection of the second touch channel 2 and the first touch channel 1, the second touch electrodes 201 located on two sides of the first touch channel 1 in the second touch channel 2 cannot be directly connected. Therefore, the touch structure 100 is provided with connection bridges 202 therein, and the connection bridges 202 are located on a different layer from the plurality of first touch electrodes 101 and the plurality of second touch electrodes 201. The second touch electrodes 201 located on two sides of the first touch channel 1 in the second touch channel 2 are all connected to the connection bridge 202, so that the second touch electrodes 201 in the same second touch channel 2 are connected in the bridge connection manner to form a touch channel conductive in the second direction X.

The touch structure 100 further includes a plurality of touch trace lines 5. The touch trace lines 5 are connected to the first touch control channels 1 and the second touch control channels 2 respectively, and are routed in the touch peripheral area 4 and extend to the bonding position of the touch chip, so as to achieve electrical connection to the touch chip. The touch chip performs position detection by scanning the change in mutual capacitance between the first touch electrodes 101 and the second touch electrodes 201, thereby identifying the touches to achieve the touch detection.

Figure 2:
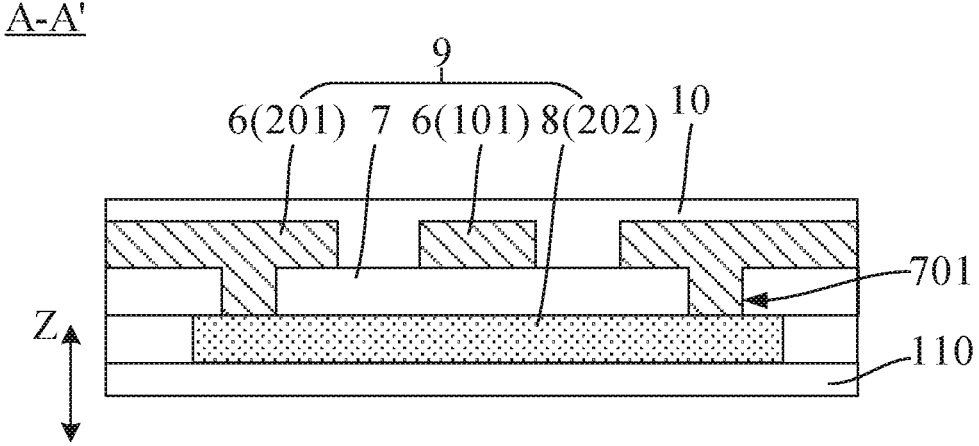
FIG. 2 is a sectional view taken along the line A-A' in FIG. 1.

FIG. 2 is a sectional view along the A-A' line in FIG. 1, as shown in FIG. 2, in terms of film layer structure, the touch structure 100 includes a touch device layer 9 and a touch protective layer 10 disposed on a side of the touch device layer 9; in a case where the touch structure 100 is disposed on the display substrate 200, the touch device layer 9 in the touch structure 100 is located on a side of the thin film encapsulation layer in the display substrate, and the touch protective layer 10 is disposed on a side of the touch device layer 9 away from the display substrate and configured to provide certain protection for the touch device layer 9.

The touch device layer 9 includes a first touch layer 8, a touch insulation layer 7 and a second touch layer 6 that are stacked. The touch insulation layer 7 is disposed between the first touch layer 8 and the second touch layer 6, and the second touch layer 6 is closer to the touch protection layer 10 than the first touch layer 8. The touch insulation layer 7 is configured to insulate the first touch layer 8 from the second touch layer 6.

The first touch layer 8 includes a plurality of connection bridges 202. The touch insulation layer 7 is provided with bridge holes 701 corresponding to the connection bridges 202, and the bridge holes 701 expose the respective connection bridges 202 in the first touch layer 8. The second touch layer 6 includes the plurality of first touch electrodes 101 and the plurality of second touch electrodes 201 located in the touch area 3, and further includes touch trace lines 5 located outside the touch peripheral area 4.

Two adjacent first touch electrodes 101 in the same first touch channel 1 are directly connected; the second touch electrodes 201 in the same second touch channel 2 and located on two sides of the first touch channel 1 are connected to the connection bridge 202 through the bridge holes 701.

In the FMLOC design, the touch structure 100 is disposed on a side of the thin film encapsulation layer in the display substrate. The touch device layer 9 in the touch structure 100 may be directly disposed outside the thin film encapsulation layer. The touch structure 100 may further be provided with an intermediate layer 110 on a side of the touch device layer 9 proximate to the thin film encapsulation layer to improve the integration effect of the touch structure 100 and the thin film encapsulation layer.

For the touch structure 100 in the related art, at least three mask (MASK) processes are usually required to form the touch device layer 9.

Here, "mask process" refers to a layer structure having specific patterns that is formed by forming a film layer for forming the specific patterns by using a film forming process, and then performing a patterning process by using a mask. Depending on different specific patterns, the patterning process may include multiple exposure, development or etching processes, and the specific patterns in the formed layer structure may be continuous or discontinuous, and these specific patterns may also be at different heights or have different thicknesses.

In addition, "same layer" mentioned herein refers to a layer structure that is formed by forming a film layer for forming specific patterns by using a same film forming process, and then performing a single patterning process by using a same mask.

In the related art, the MASK processes for forming the touch device layer 9 include at least the following three processes.

In the first MASK process, the first touch layer 8 is formed, and the first touch layer 8 includes periodically arranged connection bridges 202.

In the second MASK process, the touch insulation layer 7 is formed, and the touch insulation layer 7 includes bridge holes 701 corresponding to the connection bridges 202.

In the third MASK process, the second touch layer 6 is formed, and the second touch layer 6 includes the plurality of first touch electrodes 101, the plurality of second touch electrodes 201 and the touch trace lines 5.

It will be noted that the process of manufacturing the touch structure 100 further includes other MASK processes, such as a MASK process for manufacturing the touch protective layer 10; for the touch structure 100 having the intermediate layer 110, a MASK process for manufacturing the intermediate layer 110 further included.

The touch structure 100 has problems of poor product yield and poor stability. The inventor of the present disclosure found through research that one of the reasons for the above problems is as follows.

Since the touch structure 100 with the FMLOC design needs to be manufactured outside the thin film encapsulation layer of the display substrate, i.e., the at least three MASK processes for manufacturing the touch device layer 9 need to be performed outside the thin film encapsulation layer of the display substrate. In order to avoid any impact on the display substrate during the manufacturing process, the MASK processes usually needs to be carried out in a low-temperature (less than 85 degrees Celsius) environment, i.e., using a low-temperature process.

However, the use of low-temperature process will lead to problems of great process difficulty and great process fluctuations, especially in a bridging region between the second touch electrodes 201 in the second touch layer 6 and the connection bridge 202 in the first touch layer 8. Due to factors such as poor film quality in the low-temperature process, great fluctuations in etching uniformity, and the inability to carry out large over-etching, problems such as capacitance-related defects or poor lapping are prone to occur, such as lapping disconnection (OPEN), and short circuit (SHORT), which may affect product yield and stability.

Moreover, the cost of equipment and material suitable for low-temperature process is high, and the production efficiency with the low-temperature process is also significantly reduced, resulting in an increase in the overall cost of the touch structure 100.

Figure 3:
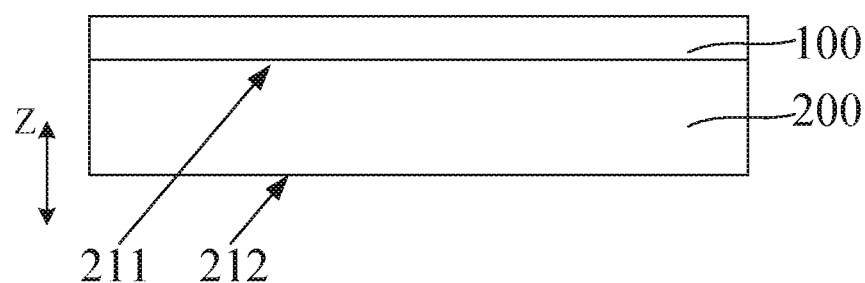
FIG. 3 is a structural diagram of a display panel, in accordance with some embodiments of the present disclosure.

In view of this, embodiments of the present disclosure provide a display panel. As shown in FIG. 3, the display panel 300 includes a display substrate 200 and a touch structure 100. The display substrate 200 is a device used to implement a display function. The display substrate 200 includes a substrate back surface 212 and a display surface 211 that are opposite to each other in a display direction. The user views the display content of the display substrate 200 in an area of the display surface 211 away from the substrate back surface 212. The touch structure 100 is a device used to implement a touch detection function and is disposed on the display surface 211 of the display substrate 200.

Figure 4:
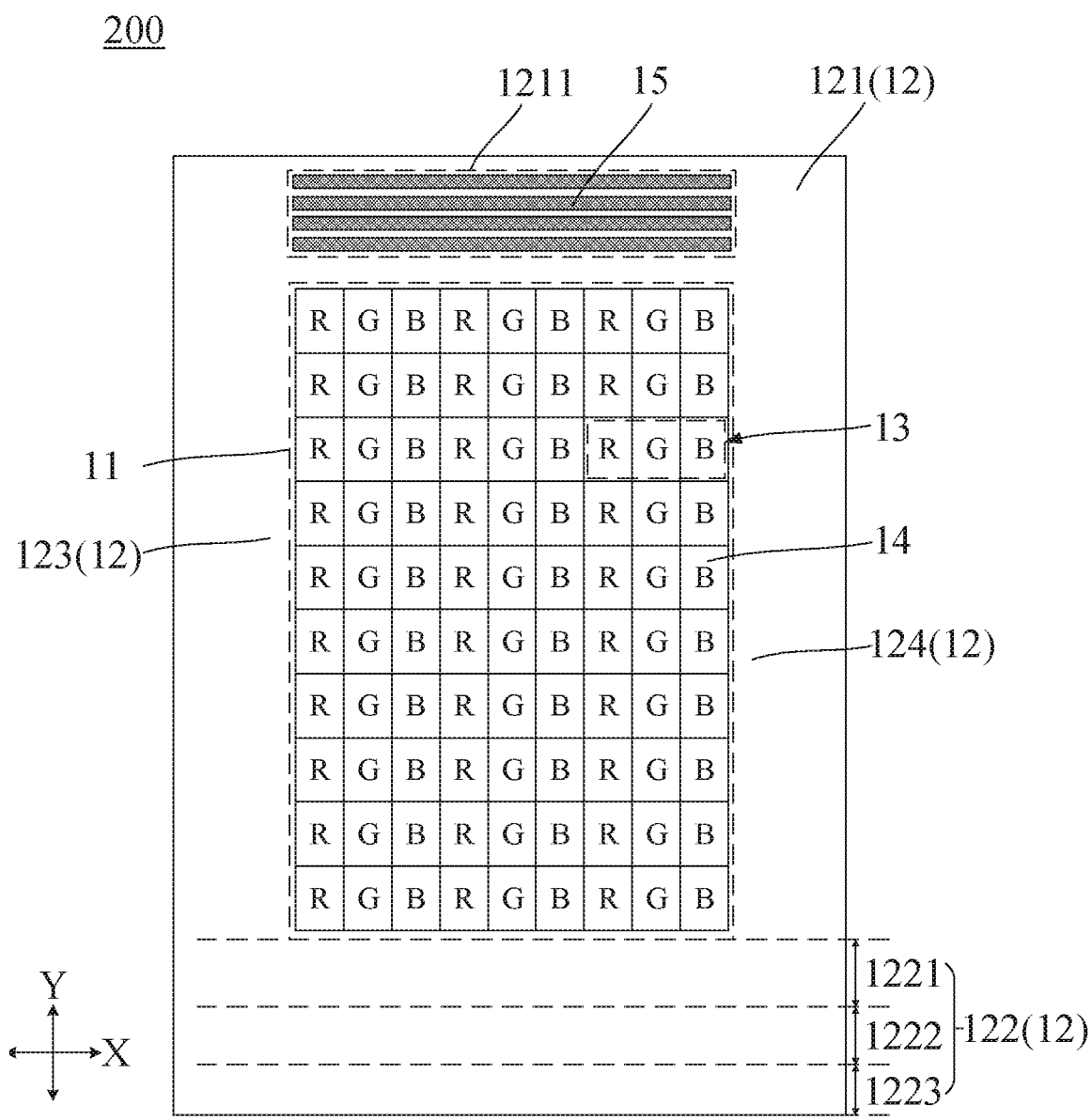
FIG. 4 is a top view of a display substrate in FIG. 3.

FIG. 4 is a top view of the display substrate 200 in FIG. 3. As shown in FIG. 4, the display substrate 200 includes a display area 11 (AA area) and a non-display area 12; the display area 11 is an area of the display substrate 200 used to implement the display function, the non-display area 12 is an area of the display substrate 200 that cannot be displayed, and the non-display area 12 is located on a peripheral of the display area 11.

The display substrate 200 includes a plurality of pixel units located in the display area 11, and the plurality of pixel units are arranged in an array to form a pixel array. The pixel units in the display substrate 200 may be organic light-emitting diodes (OLEDs), quantum dot light-emitting diodes (QLEDs), sub-millimeter light-emitting diodes (Mini LEDs), micro light-emitting diodes (Micro-LEDs) and other thin film encapsulated pixel units.

The following will be described by taking an example in which the pixel unit is an OLED pixel unit 13, for other types of pixel units, please reference will be made to the relevant content of the OLED pixel unit 13.

In some embodiments, each OLED pixel unit 13 includes a plurality of OLED sub-pixels 14. For a display substrate 200 capable of realizing color display, each OLED pixel unit 13 may include different OLED sub-pixels 14 capable of emitting different colors. When the display substrate 200 performs display, color display is achieved by controlling the light emission and color mixing of the OLED sub-pixels 14 of different colors in each OLED pixel unit 13.

For example, each OLED pixel unit 13 includes an R sub-pixel capable of emitting red light, a G sub-pixel capable of emitting green light, and a B sub-pixel capable of emitting blue light. Red, green and blue are the three primary colors. When the display substrate 200 performs display, by controlling the R sub-pixel, G sub-pixel and B sub-pixel to emit light in different degrees, the three colors may be mixed according to different proportions, thereby achieving the color display of the display panel 300.

In some other embodiments, the OLED pixel units 13 may also achieve full-color display through colorization technologies such as color transfer or color filters.

Figure 5:
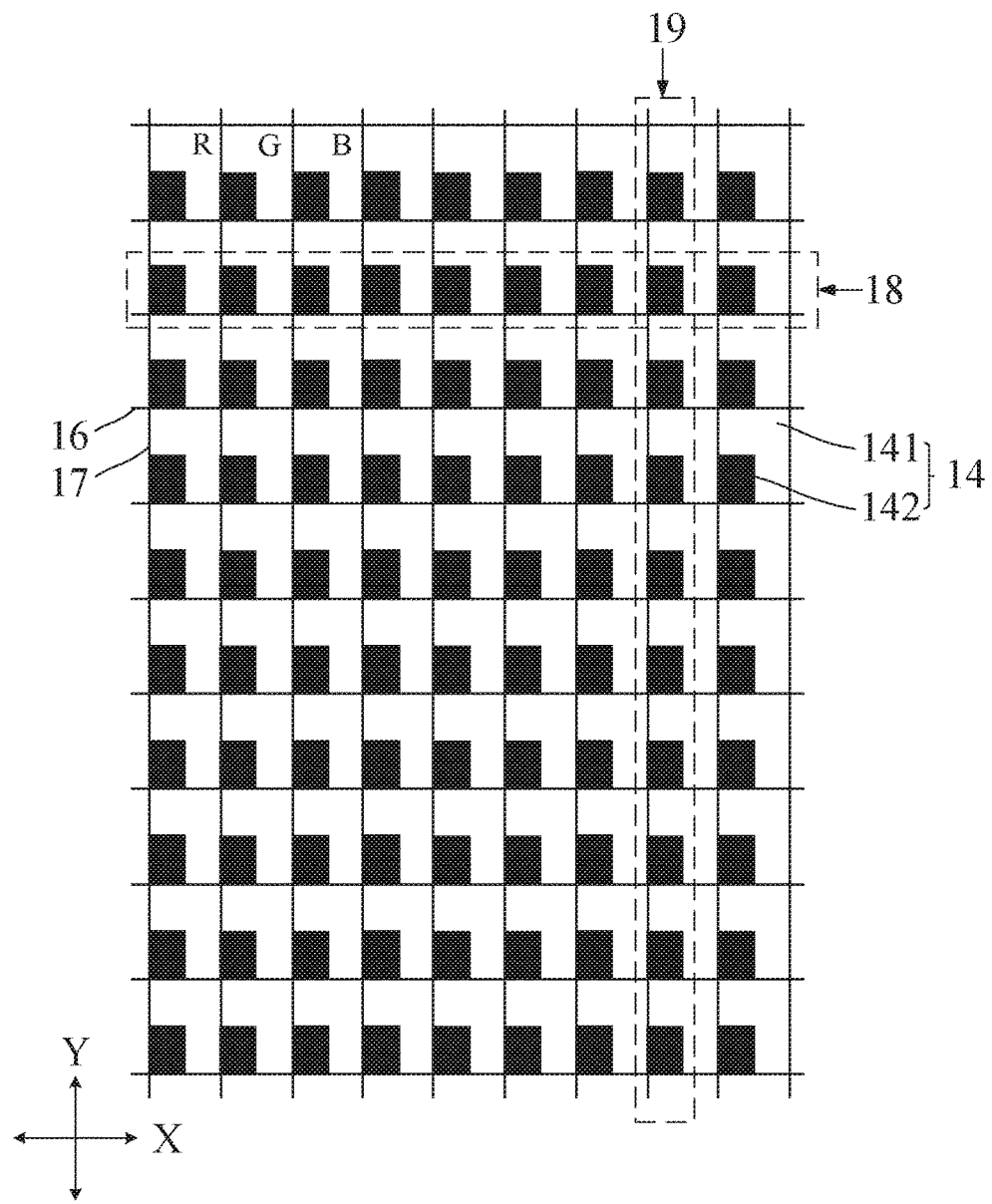
FIG. 5 is a structural diagram of a display substrate in a display area, in accordance with some embodiments of the present disclosure.

FIG. 5 is a structural diagram of the display substrate in the display area according to some embodiments of the present disclosure. As shown in FIG. 5, the display substrate 200 includes a plurality of scan signal lines 16 located in the display area 11, a plurality of data signal lines 17 and a plurality of OLED sub-pixels 14. The scan signal lines 16 each extend in the second direction X, and the plurality of scan signal lines 16 are arranged side by side in the first direction Y; the second direction X and the first direction Y are perpendicular to each other.

The data signal lines 17 each extend in the first direction Y, and the plurality of data signal lines 17 are arranged side by side in the second direction X; the plurality of scan signal lines 16 and the plurality of data signal lines 17 are arranged perpendicularly and crosswise.

The OLED sub-pixels 14 are located at the intersections of the scan signal lines 16 and the data signal lines 17. The plurality of OLED sub-pixels 14 in the display area 11 are arranged in a multi-row and multi-row array, and include a plurality of pixel rows 18 each extending in the second direction X and a plurality of pixel columns 19 each extending in the first direction Y. Each pixel row 18 includes OLED sub-pixels 14 arranged in the second direction X, and the plurality of pixel rows 18 are arranged side by side in the first direction Y; each pixel column 19 includes OLED sub-pixels 14 arranged in the first direction Y, and the plurality of pixel columns 19 are arranged side by side in the second direction X. The plurality of pixel rows 18 and the plurality of pixel columns 19 in the display area 11 form a perpendicular and crossed pixel array.

The first direction Y is an extending direction of the pixel row 19 and the data signal line 17, which may usually be referred to as a longitudinal direction. In a case where the first direction Y is the longitudinal direction, the second direction X is a transverse direction, the embodiments of the present disclosure are not limited thereto. For example, the first direction Y may be set at any angle to the longitudinal direction, and the second direction X may be set perpendicular to the first direction Y.

For example, in the embodiments shown in FIG. 5, the first direction Y is the longitudinal direction, which is parallel to the direction of the Y coordinate axis in FIG. 5. The second direction X is a transverse direction, which is parallel to the direction of the X coordinate axis in FIG. 5.

It will be noted that, for convenience of description, the structure will be described with reference to the horizontal and vertical, and the directions of the coordinate axes in the accompanying drawings herein; obviously, the directions are based on orientations or positional relationships shown in the accompanying drawings, merely for the convenience of explaining simplified descriptions of the technical solutions of the present disclosure, but not to indicate or imply that the referred devices or elements must have a particular orientation, or must be constructed or operated in a particular orientation; therefore, this should not be construed as limitations to the present disclosure.

With continued reference to FIG. 5, each OLED sub-pixel 14 includes an OLED light-emitting device 141 and a pixel driving circuit 142 for driving the OLED light-emitting device 141 to emit light.

Figure 6:
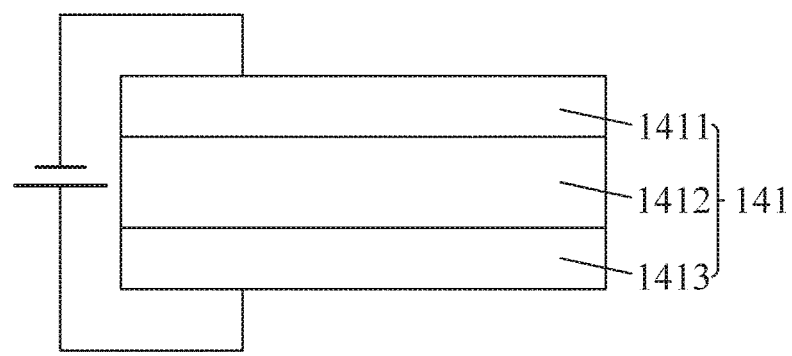
FIG. 6 is a structural diagram of an OLED light-emitting device, in accordance with some embodiments of the present disclosure.

FIG. 6 is a structural diagram of an OLED light-emitting device 141 according to some embodiments of the present disclosure. As shown in FIG. 6, the OLED light-emitting device 141 includes an anode 1411, an organic light-emitting portion 1412 and a cathode 1413. The anode 1411 is arranged opposite to the cathode 1413, and the organic light-emitting portion 1412 is located between the anode 1411 and the cathode 1413. The organic light-emitting portion 1412 includes an organic light-emitting layer (EML); the OLED light-emitting devices 141 of different colors correspond to different organic light-emitting layers.

The anode 1411 may be made of a material with a high work function, and the cathode 1413 may be made of a material with a low work function. The organic light emitting portion 1412 may further include at least one of a hole transport layer (HTL), a hole inject layer (HIL), an electron transport layer (ETL) and an electron inject layer (EIL) to improve the luminous efficiency of the organic light-emitting layer.

The pixel driving circuit 142 in the OLED sub-pixel 14 is used to drive the OLED light-emitting device 141 to emit light. In some embodiments of the present disclosure, the display substrate 200 adopts a manner of active-matrix (AM) driving, and the pixel driving circuit 142 includes at least two thin film transistors (TFT) and at least one storage capacitor.

Each thin film transistor includes a gate, a source and a drain, and the at least two thin film transistors in the pixel driving circuit 142 include a switching transistor (switching TFT) and a driving transistor (driving TFT); the anode 1411 in the OLED light-emitting device 141 is electrically connected to the source or drain of the switching transistor.

The display substrate 200 further includes a first voltage signal line, a second voltage signal line and a display driving circuit. The cathode 1413 of the OLED light-emitting device 141 is electrically connected to the first voltage signal line, and the first voltage signal line is configured to output a voltage source source (VSS) voltage signal to the display area 11; the pixel driving circuit 142 is electrically connected to the second voltage signal line, and the second voltage signal line is configured to output a voltage drain drain (VDD) voltage signal to the display area 11.

The display driving circuit includes a scan driver integrated circuit (IC) and a data driver integrated circuit (IC). The scan driver integrated circuit is connected to the scan signal lines 16 and is configured to output row scan signals during a display driving period. The data driver integrated circuit is connected to the data signal line 17, and configured to provide data voltage signals to the pixel driving circuits 142 during the display driving period.

In some embodiments, the scan driver integrated circuit adopts a gate driver on array (GOA) circuit, and the data driver integrated circuit adopts an integrated circuit chip bonded to the display substrate 200.

In the embodiments of the present disclosure, shapes of outlines of the display substrate 200 and the display area 11 may be square, circular, elliptical, or other regular or irregular shapes; the non-display area 12 is located between the outlines of the display substrate 200 and the display area 11, and has a shape that matches the shape of the outlines of the display substrate 200 and the display area 11.

With reference to FIG. 4, in some embodiments, the shape of the outline of the display substrate 200 is a first rectangle, the shape of the outline of the display area 11 is a second rectangle, and the first rectangle is sleeved on an outside of the second rectangle. Two rectangular sides perpendicular to each other of the first rectangle are respectively parallel to the first direction Y and the second direction X, and two rectangular sides perpendicular to each other of the second rectangle are also respectively parallel to the first direction Y and the second direction X.

The non-display area 12 is a rectangular frame with a certain width, and includes a first region 121 and a second region 122 disposed on two sides of the display area 11 in the first direction Y, and a third region 123 and a fourth region 122 disposed on two sides of the display area 11 in the second direction X.

In the embodiments shown in FIG. 4, the first direction Y is the longitudinal direction, the first region 121 and the second region 122 are arranged up and down relative to the display area 11 in the first direction Y, and the first region 121 is located at the upper of the second region 122; the second direction X is the transverse direction, the third region 123 and the fourth region 124 are arranged left and right in the second direction X, and the third region 123 is located at the left side of the fourth region 124. That is, the first region 121 and the second region 122 are respectively the upper frame region and the lower frame region, and the third region 123 and the fourth region 124 are respectively the left frame region and the right frame region.

In some embodiments, the display substrate 200 includes a plurality of connection portions 15 located in the first region 121, the connection portion 15 is a conductor structure extending in the second direction X, and the plurality of connection portions 15 are arranged side by side in the first direction Y. The region where the plurality of connection portions 15 are located is defined as a connection region 1211, and the connection region 1211 is located in the first region 121.

In some embodiments, the display substrate 200 includes a fan-out region 1221 and a bonding region 1223 located in the second region 122, and the bonding region 1223 is farther away from the display area 11 than the fan-out region 1221. The trace lines in the display substrate 200 may extend to the bonding region 1223 via the fan-out region 1221.

The display substrate 200 further includes bonding pins located in a bonding region 1223. The bonding pins in the bonding region 1223 are configured to bond a control chip and/or bond a flexible printed circuit board (FPC) electrically connected to the control chip; here, the control chip includes a touch chip that implements the touch detection. In a case where the data driver integrated circuit adopts an integrated circuit chip, the chip may also be bonded in the bonding region 1223.

The display substrate 200 may adopt a flexible and bendable design. For the flexible and bendable display substrate 200, the second region 122 further includes a bending region 1222 located between the fan-out region 1221 and the bonding region 1223. The display substrate 200 may be bent and deformed in the bending region 1222.

In some embodiments, the scan driver integrated circuit adopts a GOA circuit, and the GOA circuit is located in the third region 123 and/or the fourth region 124.

The display panel 300 provided in the embodiments of the present disclosure includes the display substrate 200 and the touch structure 100, and the touch structure 100 is disposed on the display surface 211 of the display substrate 200.

Figure 7:
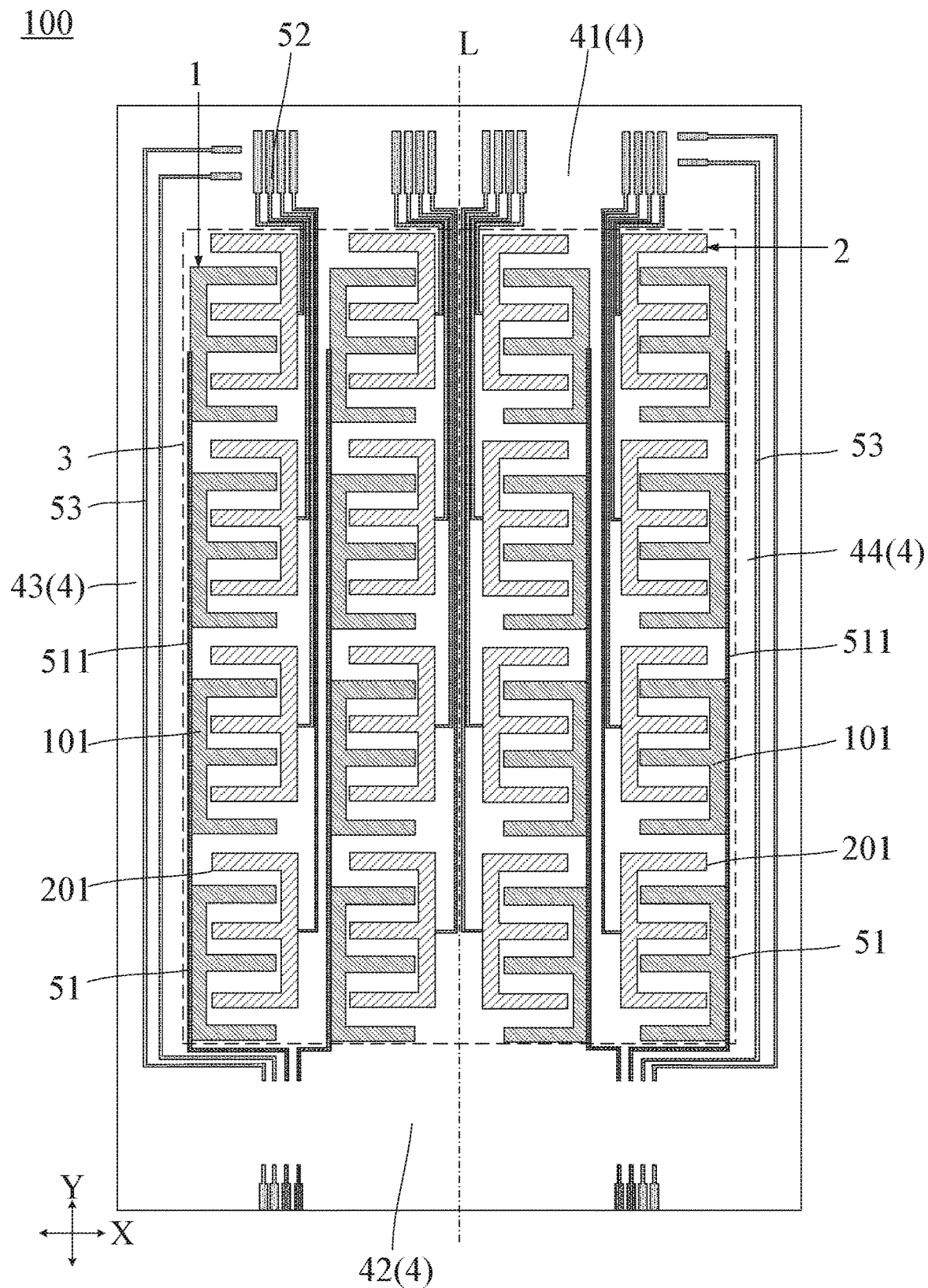
FIG. 7 is a top view of a touch structure, in accordance with some embodiments of the present disclosure.

FIG. 7 is a top view of the touch structure according to some embodiments of the present disclosure. As shown in FIG. 7, the touch structure 100 in the display panel 300 includes a touch area 3 and a touch peripheral area 4; the touch area 3 is an area of the touch structure 100 that realizes the touch detection function; the touch peripheral area 4 is an area of the touch structure 100 that cannot realize the touch detection function, and the touch peripheral area 4 is located on a peripheral of the touch area 3 and is a frame area that is sleeved on an outside of the touch area 3.

In some embodiments of the present disclosure, shapes of outlines of the touch structure 100 and the touch area 3 may be square, circular, elliptical, or other regular or irregular shapes; the touch peripheral area 4 is located between the outlines of the touch structure 100 and the touch area 3 and has a shape that matches the shapes of the outlines of the touch structure 100 and the touch area 3.

As shown in FIG. 7, the shape of the outline of the touch structure 100 is a third rectangle, the shape of the outline of the touch area 3 is a fourth rectangle, and the third rectangle is sleeved on an outside of the fourth rectangle. Two rectangular sides perpendicular to each other of the third rectangle are respectively parallel to the first direction Y and the second direction X, and two rectangular sides perpendicular to each other of the fourth rectangle are also respectively parallel to the first direction Y and the second direction X. The first direction Y and the second direction X are perpendicular to each other.

The touch peripheral area 4 is a rectangular frame with a certain width, and includes a first peripheral region 41 and a second peripheral region 42 disposed on both sides of the touch area 3 in the first direction Y, and a third peripheral region 43 and a fourth peripheral region 44 disposed on both sides of the touch area 3 in the second direction X.

In the embodiments shown in FIG. 7, the first direction Y is the longitudinal direction, which is parallel to the direction of the Y coordinate axis in FIG. 7; the second direction X is the transverse direction, which is parallel to the direction of the X coordinate axis in FIG. 7.

The first peripheral region 41 and the second peripheral region 42 are arranged up and down relative to the touch area 3 in the first direction Y, and the first peripheral region 41 is located at the upper of the second peripheral region 42; the third peripheral region 43 and the fourth peripheral region 44 are arranged left and right in the second direction X relative to the touch area 3, and the third peripheral region 43 is located on the left side of the fourth peripheral region 44.

The touch structure 100 includes an electrode array, a plurality of first trace lines 51, a plurality of second trace lines 52 and a plurality of third trace lines 53; the electrode array includes a plurality of first touch electrode 101 and a plurality of second touch electrodes 201 that are arranged in an array in the touch area 3, and two adjacent first touch electrode 101 and second touch electrode 201 are coupled to each other to form mutual capacitance to form a mutual capacitance touch device. That is, the touch structure 100 has a plurality of touch devices arranged in an array in the touch area 3.

As shown in FIG. 7, the plurality of first touch electrodes 101 in the touch area 3 are arranged to form a plurality of first touch channels 1 each extending in the first direction Y, the plurality of first touch channels 1 are arranged side by side in the second direction X, and each first touch channel 1 includes a plurality of first touch electrodes 101 arranged in the first direction Y. The plurality of first touch electrodes 101 in the first touch channel 1 are connected through the first trace line 51 to form a touch channel that conducts in the first direction Y.

For example, a portion of the first trace line 51 located in the touch area 3 includes a plurality of first trace sub-lines 511, the first trace sub-line 511 extend in the first direction Y and are located between two adjacent first touch electrodes 101, and the two adjacent first touch electrodes 101 are connected by the first trace sub-line 511.

It will be noted that the first trace sub-line 511 and the first touch electrodes 101 are of usually a one-piece structure and have no obvious structural boundaries. Therefore, the first trace sub-line 511 may also be understood as a part of the first touch electrode 101, and two adjacent first touch electrodes 101 are directly connected.

The first trace line 51 is led out from an end of the first touch channel 1 proximate to the second peripheral region 42 and extends to the second peripheral region 42.

With continued reference to FIG. 7, the plurality of second touch electrodes 201 in the touch area 3 are arranged to form a plurality of second touch channels 2 each extending in the second direction X, the plurality of second touch channels 2 are arranged side by side in the first direction Y, and each second touch channel 2 includes a plurality of second touch electrodes 201 arranged in the second direction X.

The plurality of first touch channels 1 and the plurality of second touch channels 2 are arranged perpendicularly and crosswise. At the intersection of the first touch channel 1 and the second touch channel 2, there are first touch electrode 101 and second touch electrode 201 that are coupled to each other to form mutual capacitance.

The plurality of second touch electrodes 201 in the second touch channel 2 are respectively located on a side of the adjacent first touch channel 1. The plurality of second touch electrodes 201 are in one-to-one correspondence with the plurality of second trace lines 52; the second trace line 52 is connected to the corresponding second touch electrode 201 and extends in the first direction Y in the side region of the adjacent first touch channel 1 to the first peripheral region 41.

The plurality of third trace lines 53 in the touch structure 100 extend in the third peripheral region 43 and/or the fourth peripheral region 44 and extend from the first peripheral region 41 to the second peripheral region 42. For example, as shown in FIG. 7, part of the plurality of third trace lines 53 is routed in the third peripheral region 43, and the other part the plurality of third trace lines 53 is routed in the fourth peripheral region 44.

Shapes of the first touch electrode 101 and the second touch electrode 201 may each be circular, triangular, rectangular, square, rhombus, interdigitated, Y-shaped, or the like.

In some embodiments of the present disclosure, the first touch electrodes 101 and the second touch electrodes 201 adopt interdigitated electrodes. The interdigitated electrode includes a first sub-electrode and a plurality of second sub-electrodes; extension directions of the first sub-electrode and second sub-electrode intersect; the plurality of second sub-electrodes are all located on the same side of the first sub-electrode, and ends on the same side are all connected to the first sub-electrode.

Figure 8:
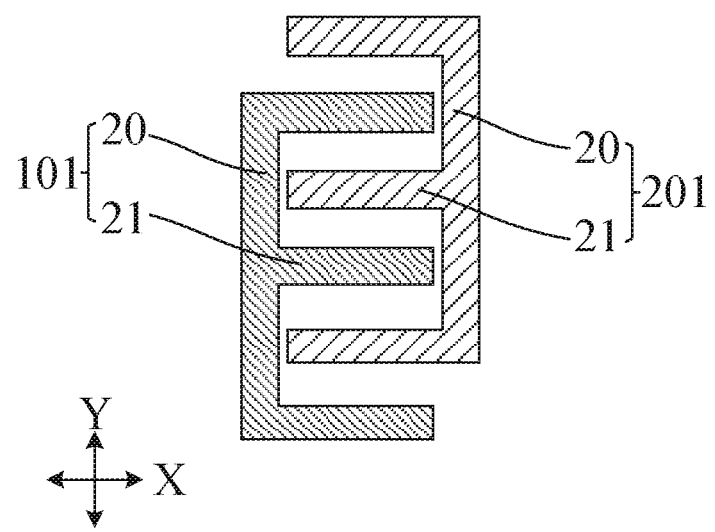
FIG. 8 is a structural diagram of a first touch electrode and a second touch electrode in FIG. 7.

For example, with reference to FIG. 8, the first touch electrode 101 and the second touch electrode 201 each using the interdigitated electrode each include one first sub-electrode 20 and three second sub-electrodes 21. The first sub-electrode 20 extends in the first direction Y, the three second sub-electrodes 21 all extend in the second direction X, and the ends on the same side are perpendicularly connected to a side of the first sub-electrode 20 to form an "E"-shaped structure.

Figure 9:
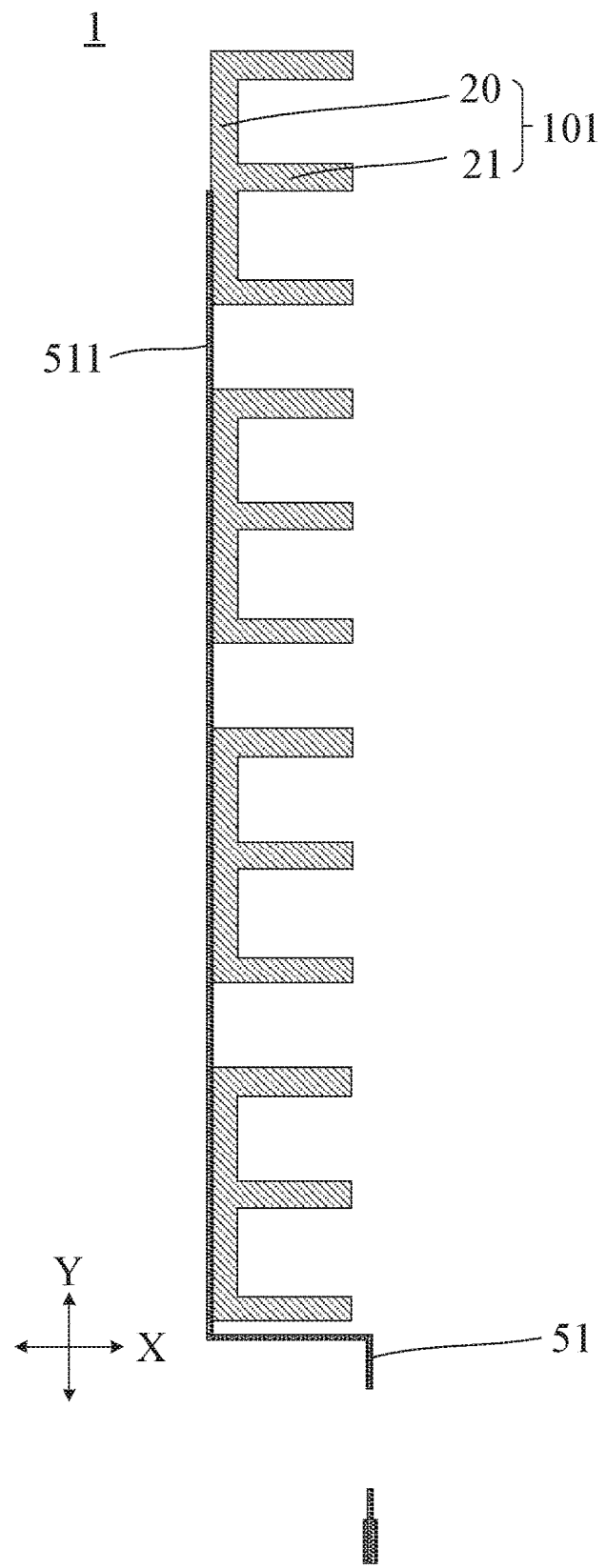
FIG. 9 is a schematic diagram of a first touch channel in FIG. 7.

FIG. 9 is a structural diagram of the first touch channel in FIG. 7. With reference to FIGS. 7 to 9, in the plurality of first touch electrodes 101 of the first touch channel 1, the plurality of first sub-electrodes 20 are arranged parallel to the first direction Y and in a collinear manner; the first trace sub-line 511 extend collinearly with the first sub-electrodes 20 and are connected to two adjacent first sub-electrodes 20, thereby connecting two adjacent first touch electrodes 20.

It will be noted that the first trace sub-line 511 and the first sub-electrode of the first touch electrode 101 are of usually a one-piece structure and have no obvious structural boundaries. Therefore, the first trace sub-line 511 may also be understood as a part of the first touch electrode 101, and two adjacent first touch electrodes 101 are directly connected.

In the plurality of first touch electrodes 101 in the first touch channel 1, the second sub-electrodes 21 are all located on the same side of the first sub-electrodes 20, and the second sub-electrodes 21 all extend parallel to the second direction X.

Figure 10:
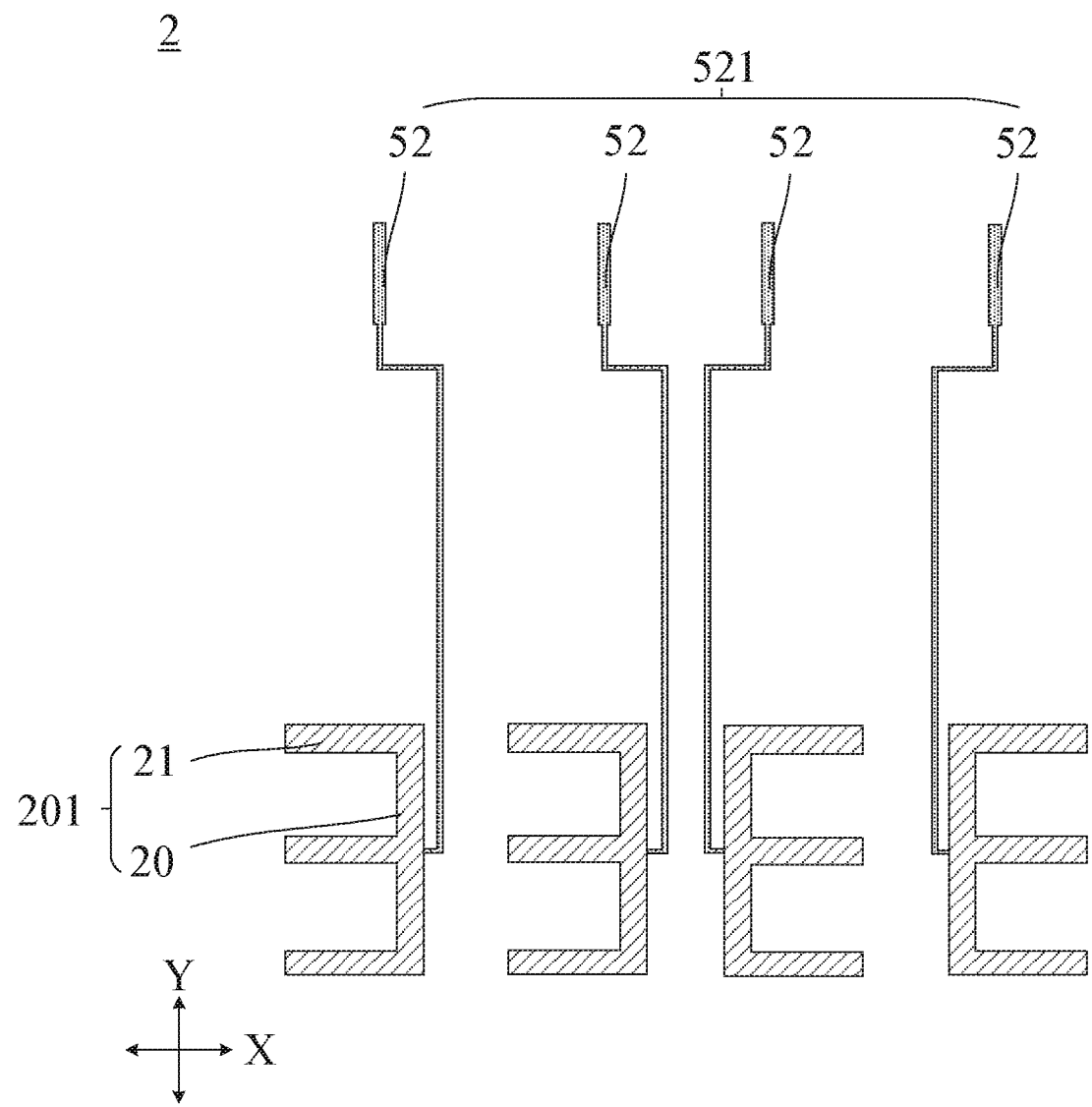
FIG. 10 is a schematic diagram of a second touch channel in FIG. 7.

FIG. 10 is a structural diagram of the second touch channels in FIG. 7. With reference to FIGS. 7, 8 and 10, in the plurality of second touch electrodes 201 in the second touch channel 2, the plurality of first sub-electrodes 20 are all parallel to the first direction Y, and the three second sub-electrodes 21 are respectively aligned in the second direction X; the second trace line 52 is connected to the first sub-electrode 20 on a side of the first sub-electrode 20 away from the second sub-electrodes 21.

Multiple second trace lines 52 connected to the plurality of second touch electrodes 201 in the same second touch channel 2 are defined as a first line group 521. The touch structure 100 includes a plurality of first line groups 521, and a first line group 521 has a corresponding relationship with a second touch channel 2.

At the intersection of the first touch channel 1 and the second touch channel 2, the first touch electrode 101 and second touch electrode 201 that are interlaced are included. Referring to FIG. 8, the first sub-electrode 20 of the first touch electrode 101 is arranged opposite to the first sub-electrodes 20 of the second touch electrode 201; for the first touch electrode 101, the plurality of second sub-electrodes 21 are connected to a side of the first sub-electrode 20 proximate to the second touch electrode 201; and for the second touch electrode 201, the plurality of second sub-electrodes 21 are connected to a side of the first sub-electrode 20 proximate to the first touch electrode 101. The plurality of second sub-electrodes 21 of the first touch electrode 101 and the plurality of second sub-electrodes 21 of the second touch electrode 201 are alternately arranged at intervals, thereby achieving the fact that the first touch electrode 101 and the second touch electrode 201 are interlaced. The interlaced first touch electrode 101 and second touch electrode 201 may be coupled to each other to form mutual capacitance.

In some embodiments of the present disclosure, a first touch electrode 101 and a second touch electrode 201 for example, the interlaced first touch electrode 101 and second touch electrode 201 in the above embodiments, are arranged in pairs.

Figure 11:
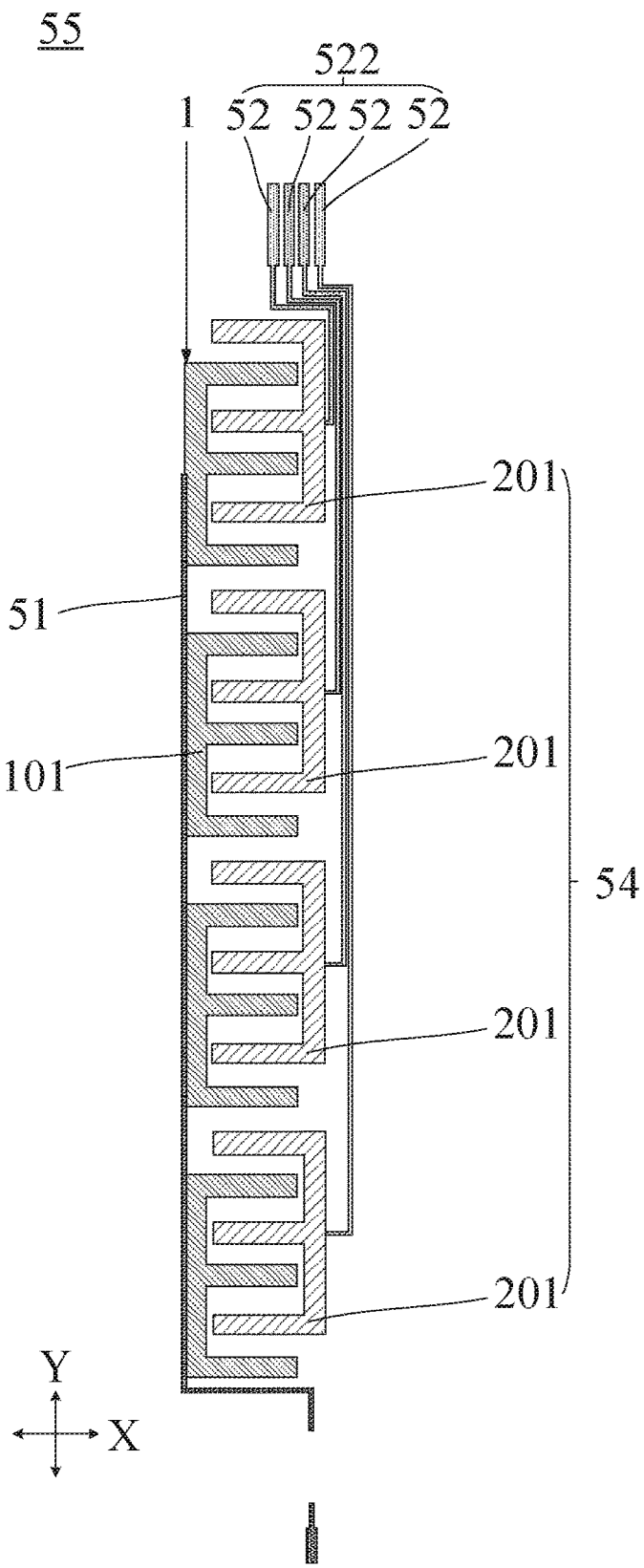
FIG. 11 is a structural diagram of a first touch channel and a first electrode group in FIG. 7.

Second touch electrodes 201 paired with the plurality of first touch electrodes 101 in the first touch channel 1 are defined as first electrodes. FIG. 11 is a structural diagram of the first touch channel and a first electrode group in FIG. 7. With reference to FIGS. 11 and 7, the first electrode group 54 includes multiple second touch electrodes 201 arranged in the first direction Y, and the multiple second touch electrodes 201 belong to different second touch channels 201. In the touch area 3, there are a plurality of first electrode groups 54 corresponding to the plurality of first touch channels 1, and the plurality of first electrode groups 54 are arranged in the second direction X.

The first electrode group 54 may be located on any side of the corresponding to the first touch channel 1 in the second direction X. In some embodiments, the plurality of first electrode groups 54 and the plurality of first touch channels 1 are respectively arranged symmetrically with respect to a center line of symmetry parallel to the first direction Y. For example, as shown in FIG. 7, the center line of symmetry L is a bisector of the touch area 3 in the second direction X. The plurality of first electrode groups 54 and the plurality of first touch channels 1 are arranged symmetrically with respect to the center line of symmetry L; on the left side of the center line of symmetry L, the first electrode groups 54 are located on the right side of the respective first touch channels 1; on the right side of the center line of symmetry L, the first electrode groups 54 are located on the left side of the respective first touch channels 1.

The multiple second trace lines 52 connected to the multiple second touch electrodes 201 in the same first electrode group 54 are defined as a second line group 522. The touch structure 100 includes a plurality of second line groups 522. Each second line group 522 includes multiple second trace lines 52, and the multiple second touch electrodes 201 connected to the multiple second trace lines 52 respectively belong to different second touch channels 2. The multiple second trace lines 52 in the second line group 522 are routed on the same side of the first electrode group 54.

The first touch channel 1 and the corresponding first electrode group 54 are collectively referred to as a second electrode group 55. From the above description, it can be seen that the first trace line 51 and the second line group 522 that are connected to the second electrode group 55 are respectively located on two sides of the second electrode group 55.

Figure 12:
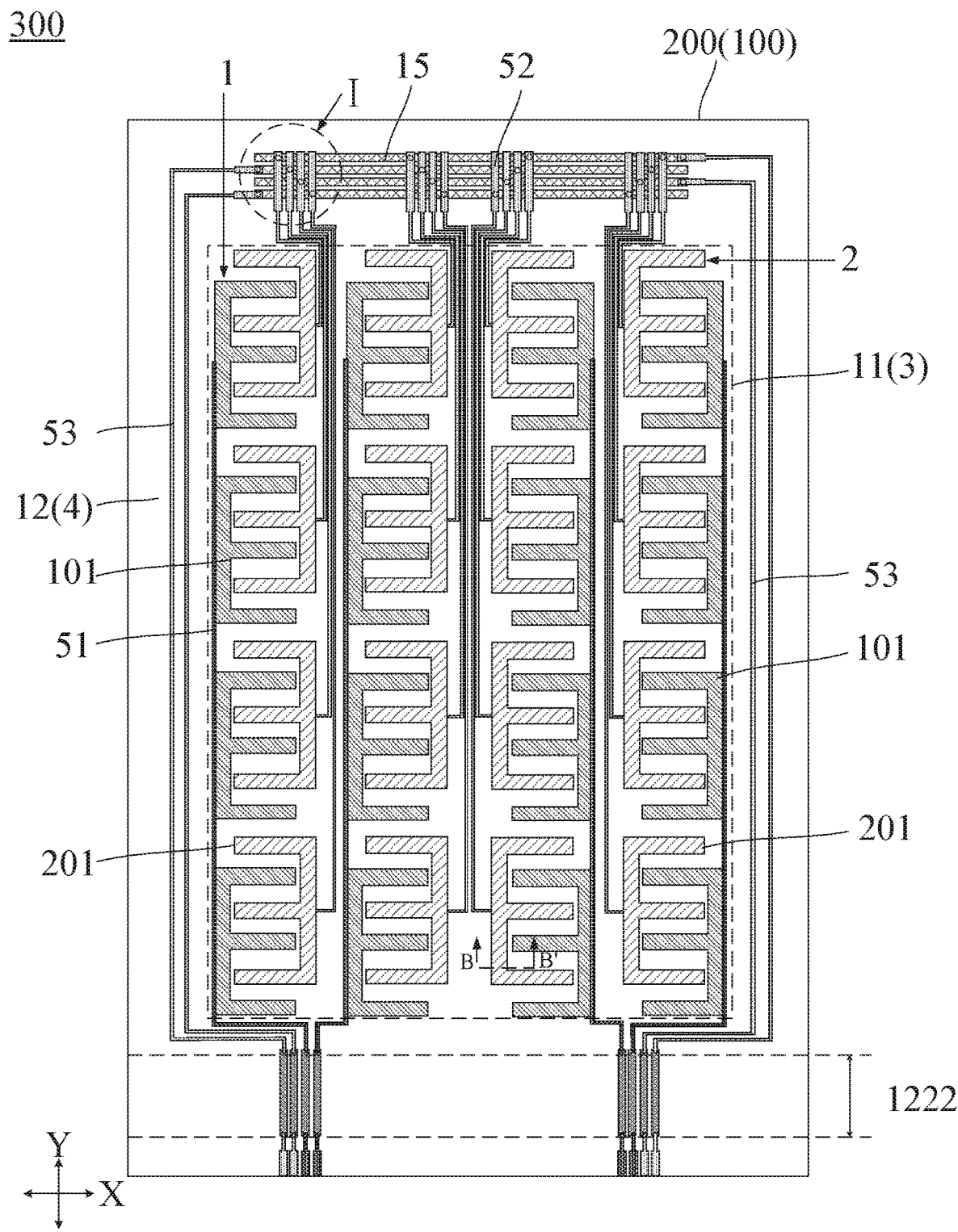
FIG. 12 is a top view of a display panel, in accordance with some embodiments of the present disclosure.
Figure 13:
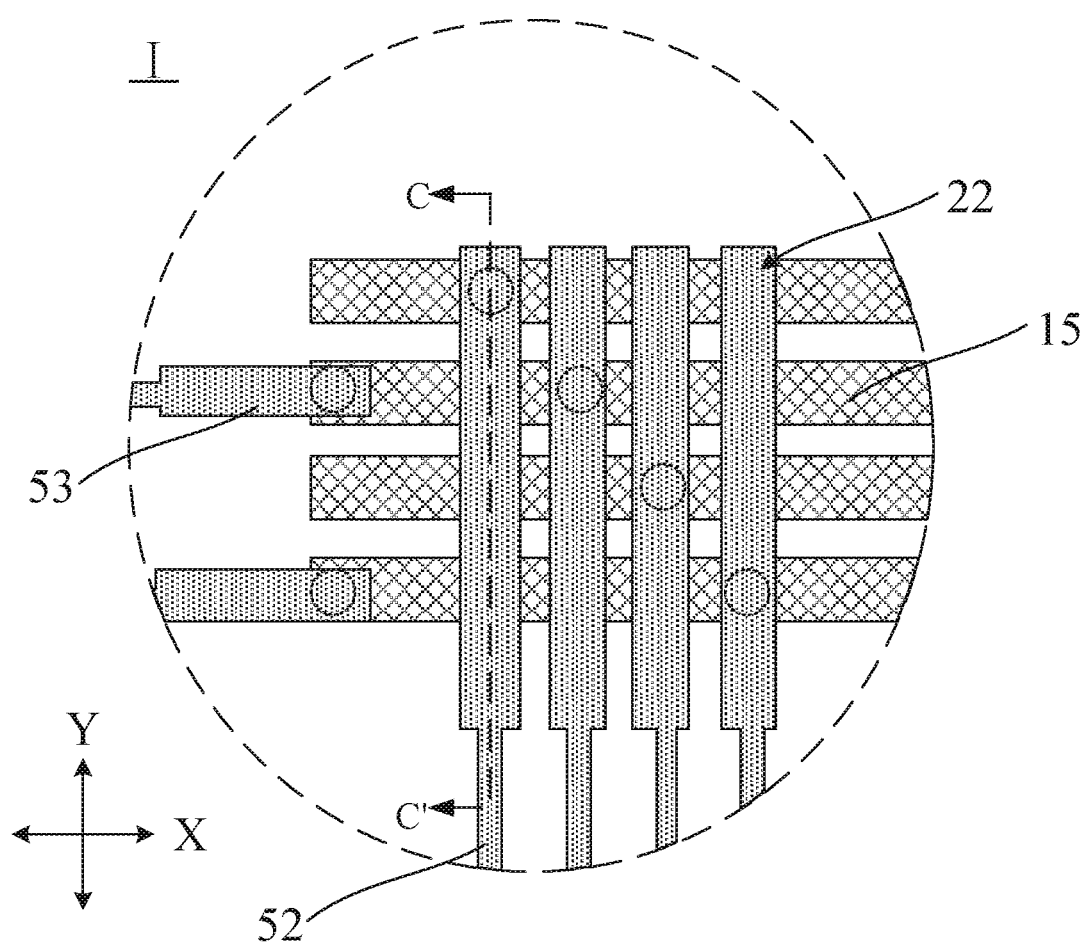
FIG. 13 is an partial enlarged view of the I region in FIG. 12.

FIG. 12 is a top view of a display panel according to some embodiments of the present disclosure; FIG. 13 is a partial enlarged view of the region I in FIG. 12. As shown in FIGS. 12 and 13, the display panel 300 includes a display substrate 200 and a touch structure 100, and the touch structure 100 is disposed on the display surface of the display substrate 200.

With reference to FIGS. 4 and 7, for orthographic projections on the display substrate 200, the touch area 3 covers the entire display area 11, the entire touch structure 100 overlaps the display substrate 200, and the entire touch peripheral area 4 is within the non-display area 12, the first peripheral region 41 is within the first region 121, the second peripheral region 42 is within the second region 122, the third peripheral region 43 is within the third region 123, and the fourth peripheral region 44 is within the third region 123.

The outline of the touch area 3 may be aligned with the outline of the display area 11, or may slightly exceed the outline of the display area 11. The outline of the display substrate 200 may be aligned with the outline of the touch structure 100, or may slightly exceed the outline of the touch structure 100.

According to the above description of the display substrate 200, the first region 121 includes a connection region 1211, and the display substrate 200 is provided with a plurality of connection portions 15 in the connection region 1211. For orthographic projections on the display substrate 200, the first peripheral region 41 overlaps the connection region 1211.

According to the above description of the touch structure 100, the plurality of second trace lines 52 in the touch structure 100 are connected to the second touch electrodes 201 in the touch area 3 and extend to the first peripheral region 41. The touch structure 100 includes a plurality of first line groups 521. The first line groups 521 are in one-to-one correspondence with the second touch channels 2. The plurality of second touch electrodes 201 in the second touch channel 2 are respectively connected to the multiple second trace lines 52 in the first line group 521, and the multiple second trace lines 52 in the first line group 521 respectively extend from the side area of the respective first touch channels 1 to the first peripheral region 41.

The first line group 521 also has a corresponding relationship with the connection portions 15. In the first peripheral region 41, the multiple second trace lines 52 in the first line group 521 are connected to a same connection portion 15. Thus, in the second touch channel 2 connected to the first line group 521, the multiple second touch electrodes 201 are connected to the same connection portion 15 through the multiple second trace lines 52 in the first line group 521. The plurality of second touch electrodes 201 in the second touch channel 2 are conducted in the second direction X through the connection portion 15 and the multiple second trace lines 52, and the "crossover" with the first touch channel 1 is achieved.

In some embodiments, the number of connection portions 15 in the display substrate 200 is the same as the number of the second touch channels 2 in the touch structure 100; the plurality of connection portions 15 are arranged in the first direction Y, and has a corresponding relationship with the plurality of second touch channels 2 in the touch area 3 along the first direction Y. For example, in the first direction Y, the connection portion 15 at a first position is used to connect to the second touch channel 2 at the first position, the connection portion 15 at a second position is used to connect to the second touch channel 2 at the second position, and so on.

The third trace line 53 in the touch structure 100 is configured to connect the second touch channel 2 conductive in the second direction X, and extend to the second peripheral region 42. The plurality of third trace lines 53 in the touch structure 100 have a corresponding relationship with the connection portions 15 in the display substrate 200. A portion of the third trace line 53 located in the first peripheral region 41 is connected to the corresponding connection portion 15 to lead out the second touch channel 2 conducted by the connecting portion 15, and the third trace line 53 is routed in the third peripheral region 43 or the fourth peripheral region 44 and extends to the second peripheral region 42.

It can be seen from the above description, the touch structure 100 includes a plurality of first trace lines 51 and a plurality of third trace lines 53 extending to the second peripheral region 42. The display substrate 200 includes a bonding region 1223 in the second region 122; for orthographic projections on the display substrate 200, the second peripheral region 42 overlaps the bonding region 1223. The plurality of first trace lines 51 and the plurality of third trace lines 53 extend in the second peripheral region 42 to a part that overlaps the bonding region 1223 and are electrically connected to the bonding pins in the bonding region 1223.

The bonding pins in the bonding region 1223 are configured to bond a control chip and/or a flexible circuit board electrically connected to the control chip; here, the control chip includes a touch chip that implements touch detection. Therefore, the electrical connection between the touch chip and the plurality of first touch channels 1 and the plurality of second touch channels 2 may be achieved by using the above structure.

During the operation of the touch structure 100, the first touch electrode 101 serves as a signal transmitting electrode, and the second touch electrode 201 serves as a signal receiving electrode; alternatively, the second touch electrode 201 serves as a signal transmitting electrode, and the first touch electrode 101 serves as a signal receiving electrode; the touch chip performs position detection by scanning the changes in the mutual capacitance value between the first touch electrode 101 and the second touch electrode 201, thereby identifying the touch to achieve touch detection.

In the display panel 300 in the above embodiments, the connection portion 15 for connecting the second touch electrodes 201 in the second touch channel 2 are disposed in the display substrate 200 and located in the non-display area 12 of the display substrate 200; the connection position between the second trace lines 52 and the connection portion 15 is also located in the non-display area 12 of the display substrate 200. With such the design, it possible to achieve the manufacture of the connecting portion 15 and the connection between the connection portion 15 and the second trace lines 52 in the non-display area 12, which avoids the display area 11, and avoids providing openings in the display area 11, thereby avoiding the influence on the OLED light-emitting devices 141 in the display area 11 during the process. Thus, it is not limited by the low-temperature process, and the manufacturing method that is not limited by the low-temperature process may reduce the process difficulty and process fluctuation to ensure processing efficiency, product yield and stability. In addition, costs may be reduced.

It can be seen from the above description that the first touch channel 1 is conductive in the first direction Y, the second touch channel 2 is conductive in the second direction X, and there is no intersection of the structures at the intersection of the first touch channel 1 and the second touch channel 2. Therefore, the first touch channels 1 and the second touch channels 2 may be formed in a metal layer.

In some embodiments, the plurality of first touch electrodes 101, the plurality of second touch electrodes 201, the plurality of first trace lines 51, the plurality of second trace lines 52 and the plurality of third trace lines 53 are arranged in the same layer. Thus, the plurality of first touch electrodes 101, the plurality of second touch electrodes 201, the plurality of first trace lines 51, the plurality of second trace lines 52 and the plurality of third trace lines 53 may be manufactured using one MASK process, which may greatly simplify the process, reduce production costs, and improve product quality.

Figure 14:
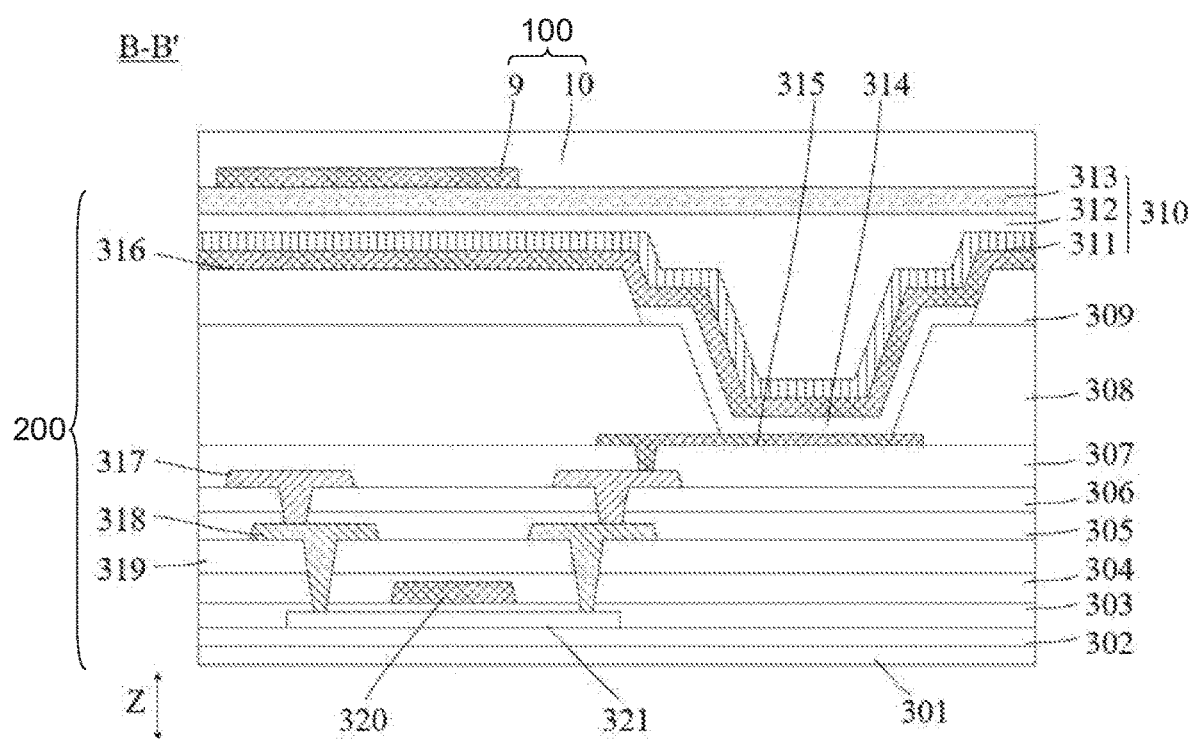
FIG. 14 is a sectional view taken along the line B-B' in FIG. 12.

FIG. 14 is a sectional view along the B-B' line in FIG. 12. As shown in FIG. 14, the display panel 300 includes the display substrate 200 and the touch structure 100. In terms of film layer structure, the display substrate 200 includes a base substrate 301, a driving circuit layer, a light-emitting device layer and thin film encapsulation layer 310, and the touch structure 100 includes a touch device layer 9 and a touch protective layer 10.

The base substrate 301 may be a flexible substrate that capable of bending, and the flexible substrate may be made of polyimide (PI), polycarbonate (PC), polyethersulfone (PES), polyethylene terephthalate (PET), polyethylene naphthalate (PEN), polyarylate (PAR), fiberglass reinforced plastic (FRP) or other polymer materials. Alternatively, the base substrate 301 may be a rigid plate-shaped structure, for example, may be a glass plate, a quartz plate, an acrylic plate, or other rigid plates.

Some of the embodiments of the present disclosure are described by taking an example in which the base substrate 301 is the flexible substrate.

The base substrate 301 includes a first surface and a second surface oppositely arranged in a third direction Z, and the third direction Z is perpendicular to both the first direction Y and the second direction X. Considering the orientation shown in FIG. 14 as an example, the third direction Z is the longitudinal direction and is parallel to the direction of the Z coordinate axis in FIG. 14. The first surface is located above the second surface; the first surface is an upper surface, and the second surface a lower surface.

In the display substrate 200, the driving circuit layer is disposed on the first surface of the base substrate 301, which is a collective name for the pixel driving circuits 142 of all OLED sub-pixels 14 in the display substrate 200; the base substrate 301 and the driving circuit layer are usually collectively referred to as a backplane (BP).

The driving circuit layer includes a film layer structure forming the pixel driving circuits 142. In some embodiments, the driving circuit layer includes a buffer layer 302, an active layer 321, a first gate insulating layer (GI1) 303, a gate metal layer (Gate) 320, a second gate insulating layer (GI2) 304, an interlayer dielectric layer (ILD) 319, a first source-drain metal layer (SD1) 318, a first planarization layer (PLN) 305, a passivation layer (PVX) 306, a second source-drain metal layer (SD2) 317, and a second planarization layer 307 that are stacked in a stacking direction on the first surface of the base substrate 301.

The buffer layer 302 is disposed on the first surface of the base substrate 301 and is an inorganic insulating film layer and made of silicon-containing inorganic material and may be of a multi-layer or single-layer structure. The silicon-containing inorganic material may be at least one of silicon oxide ($SiO_2$), silicon nitride ($SiN_x$) and silicon oxynitride (SiON). With such the design, the base substrate 301 may be isolated from the structure on the base substrate 301 by using the material properties of the inorganic material, so as to reduce or block the penetration of foreign substances, moisture, or outside air from below the base substrate 301, and provide a flat surface.

The active layer 321 is disposed on a side of the buffer layer 302 away from the base substrate 301, and may be made of amorphous silicon (α-Si, also known as amorphous silicon), polycrystalline silicon (Poly-Si), low-temperature polycrystalline silicon (LTPS), metal oxides (e.g. indium gallium zinc oxide (IGZO)), or the like.

The first gate insulating layer 303 is disposed on a side of the active layer 321 away from the base substrate 301. The gate metal layer 320 is disposed on a side of the first gate insulating layer 303 away from the base substrate 301, and the gate metal layer 320 may be used to form the gate of the thin film transistor, the scan signal line 16 and the plate of the storage capacitor. The active layer 321 includes a channel region corresponding to the gate.

The second gate insulating layer 304 is disposed on a side of the gate metal layer 320 away from the base substrate 301, and the interlayer dielectric layer 319 is disposed on a side of the second gate insulating layer away from the base substrate 301; the first source-drain metal layer 318 is disposed on a side of the interlayer dielectric layer 319 away from the base substrate 301; the first planarization layer 305 and the passivation layer 306 are disposed on a side of the first source-drain metal layer 318 away from the base substrate 301, and the second source-drain metal layer 317 is disposed on a side of the passivation layer 306 away from the base substrate 301.

In the above embodiments, the first gate insulating layer 303, the second gate insulating layer 304, the interlayer dielectric layer 319 and the passivation layer 306 are all inorganic insulating film layers, which may be made of a silicon-containing inorganic material, and may each be of a multi-layer or single-layer structure; the silicon-containing inorganic material may be at least one of silicon oxide ($SiO_2$), silicon nitride ($SiN_X$) and silicon oxynitride (SiON).

The first source-drain metal layer 318 and the second source-drain metal layer 317 are metal layers at different heights; the source and drain of the thin film transistor, signal lines such as the data signal line 17, first voltage signal line and the second voltage signal line in the display substrate 200, and the plate of the storage capacitor may be selectively disposed on the first source-drain metal layer 318 or the second source-drain metal layer 317.

The second planarization layer 307 is disposed on a side of the second source-drain metal layer 317 away from the base substrate 301; the second planarization layer 307 has a flat surface on the side away from the base substrate 301, and the flat surface facilitates the manufacture and shaping for the structure thereon.

It can be seen from the above description, the pixel driving circuit 142 of the OLED sub-pixel 14 may be formed in the driving circuit layer. The light-emitting device layer is disposed on a side of the driving circuit layer away from the base substrate 301 and used to form the plurality of OLED light-emitting devices 141 in the plurality of OLED sub-pixels 14 in the display area 11. Each OLED light-emitting device 141 includes an anode 1411, an organic light-emitting portion 1412, and a cathode 1413 that are stacked.

In some embodiments, the light-emitting device layer includes a first electrode layer 315, a light-emitting functional layer 314 and a second electrode layer 316 that are stacked, in the stacking direction, on the side of the driving circuit layer away from the base substrate 301; the first electrode layer 315 is disposed on a side of the second planarization layer 307 away from the base substrate 301 and includes a plurality of anodes 1411 corresponding to the plurality of OLED light-emitting devices 141.

The light-emitting functional layer 314 is disposed on a side of the first electrode layer 315 away from the base substrate 301 and includes a plurality of organic light-emitting portions 1412 corresponding to the plurality of OLED light-emitting devices 141. The plurality of organic light-emitting portions 1412 may be independent block structures, or may be connected to form a whole layer structure.

The second electrode layer 316 is located on a side of the light-emitting functional layer 314 away from the first electrode layer 315 and includes a plurality of cathodes 1413 corresponding to the plurality of OLED light-emitting devices 141. The plurality of cathodes 1413 may be an independent block structure or may be connected to form a whole layer structure.

In some embodiments, the display substrate 200 further includes a pixel definition layer (PDL) 308 and a spacer (PS) layer.

The pixel definition layer 308 is disposed on a side of the first electrode layer 315 away from the base substrate 301 and has a plurality of pixel openings; an OLED light-emitting device 141 is arranged corresponding to a pixel opening. For example, the anode 1411 of the OLED light-emitting device 141 is located at the bottom of the pixel opening and is exposed through the pixel opening; at least part of the organic light-emitting portion 1412 of the OLED light-emitting device 141 is located in the pixel opening, and the cathode 1413 is disposed on a side of the organic light-emitting portion 1412 away from the anode 1411.

The spacer layer 309 is disposed on a side of the pixel definition layer 308 away from the base substrate 301 and is closer to the pixel definition layer 308 relative to the second electrode layer 316. The spacer layer 309 includes a plurality of spacers, the spacers are columnar structures erected on the pixel definition layer 308, and the columnar structures are used to support the mask used for evaporation.

In the display substrate 200, the thin film encapsulation layer 310 covers the side of the light-emitting device layer away from the base substrate 301 to achieve encapsulation of the OLED light-emitting devices 141. The thin film encapsulation layer 310 includes an organic encapsulation layer and an inorganic encapsulation layer that are stacked. The inorganic encapsulation layer is at least encapsulated on the side of the organic encapsulation layer away from the base substrate 301, i.e., the outside of the organic encapsulation layer.

The inorganic encapsulation layer may be made of an inorganic material, and the inorganic material may be at least one of silicon oxide ($SiO_2$), silicon nitride ($SiN_X$) and silicon nitride oxide (SiON). The inorganic encapsulation layer has a good property of blocking moisture and oxygen to prevent external moisture and oxygen from affecting the organic material in the OLED light-emitting devices 141. The material of the organic encapsulation layer 312 may be acrylic-based polymer, silicon-based polymer and other polymers. The organic encapsulation layer 312 may absorb and disperse the stress between layers well to avoid the reduction of the barrier for the moisture and oxygen due to cracks in the dense inorganic encapsulation layer.

As shown in FIG. 14, in some of the embodiments of the present disclosure, the thin film encapsulation layer 310 includes a first inorganic encapsulation layer 311, an organic encapsulation layer 312 and a second inorganic encapsulation layer 313 that are stacked in a direction away from the base substrate 301. The first inorganic encapsulation layer 311 and the second inorganic encapsulation layer 313 are disposed on both sides of the organic encapsulation layer 312 to cover the organic encapsulation layer 312 to fully utilize the performance of blocking the moisture of the inorganic encapsulation layer.

With continued reference to refer to FIG. 14, the display panel 300 includes the touch structure 100, and the touch structure 100 adopts a flexible multi-layer on cell (FMLOC) design and is disposed on a side of the thin film encapsulation layer 310 away from the base substrate 301.

The touch structure 100 includes a touch device layer 9 and a touch protective layer 10. The touch device layer 9 includes a plurality of first touch electrodes 101, a plurality of second touch electrodes 201, a plurality of first trace lines 51, a plurality of second trace lines 52 and a plurality of third trace lines 53. The touch device layer 9 may be made of at least one of indium tin oxide (ITO), metal mesh, and nanosilver wires.

In a case where the touch device layer 9 adopts metal mesh, the plurality of first touch electrodes 101, the plurality of second touch electrodes 201, the plurality of first trace lines 51, the plurality of second trace lines 52 and the plurality of third trace lines 53 are all grid-shaped.

The touch protective layer 10 is disposed on a side of the touch device layer 9 away from the thin film encapsulation layer to achieve a certain protective effect on the touch device layer 9.

It can be seen from FIG. 14, the touch device layer 9 in the touch structure 100 is directly disposed outside the thin film encapsulation layer 310. In a possible implementation, the touch structure 100 may further provide an intermediate layer on a side of the touch device layer 9 proximate to the thin film encapsulation layer 310 thereon to improve the integration effect of the touch structure 100 and the thin film encapsulation layer 310. The intermediate layer may be made of an inorganic material, such as at least one of silicon oxide ($SiO_2$), silicon nitride ($SiN_X$), and silicon oxynitride (SiON), or may be made of an organic material, such as negative photoresist (optically clear adhesive).

Figure 15:
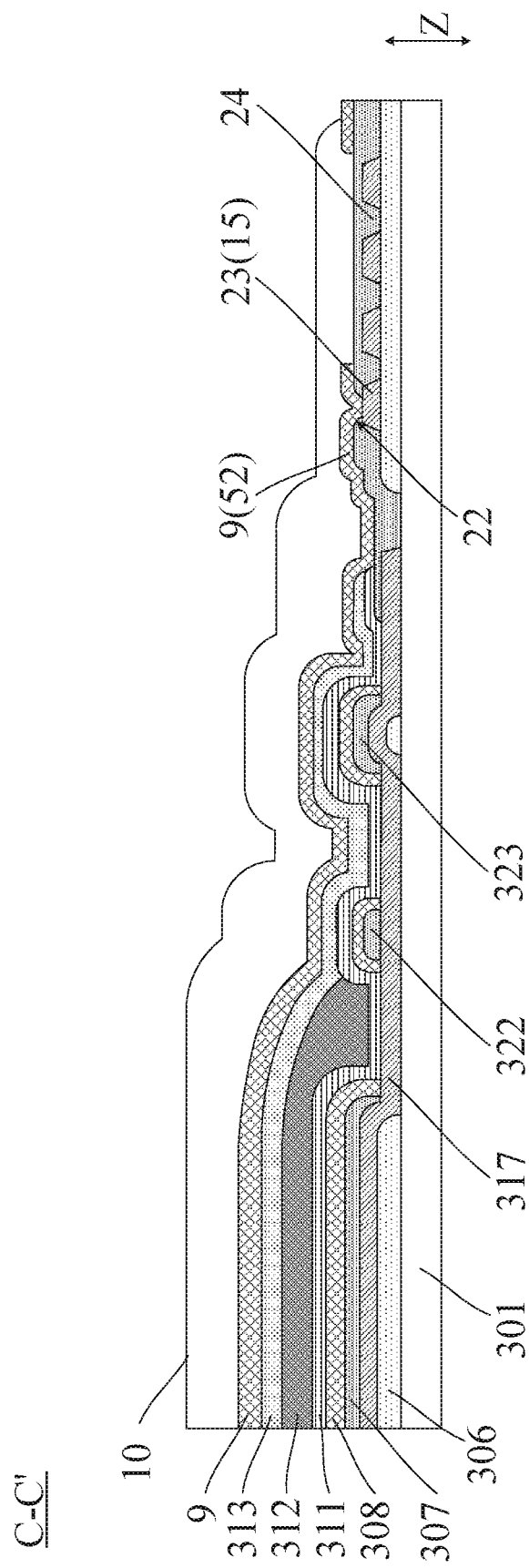
FIG. 15 is a sectional view taken along the line C-C' in FIG. 13.

FIG. 15 is a sectional view along the C-C' line in FIG. 13, as shown in FIG. 15, the display substrate 200 includes the base substrate 301, a first metal layer 23 and a first insulating layer 24; the first metal layer 23 is disposed between the base substrate 301 and the touch device layer 9 in the touch structure 100, and the first insulating layer 24 is disposed between the first metal layer 23 and the touch device layer 9. The plurality of connection portions 15 are located in the first metal layer 23. The first insulating layer 24 has first lapping holes 22 exposing the connection portions 15. The second trace line 52 is connected to the connection portion 15 through the first lapping hole 22.

With reference to FIG. 14, the first metal layer 23 may be the gate metal layer 320, the first source-drain metal layer 318 or the second source-drain metal layer 317 in the display substrate 200. The first insulating layer 24 is a single-layer or multi-layer insulating material layer located on a side of the first metal layer 23 away from the base substrate 301 in the display substrate 200. For example, in a case where the first metal layer 23 is the gate metal layer 320, the first insulating layer 24 may be at least one of the second gate insulating layer 304, the interlayer dielectric layer 319, the first planarization layer 305, the passivation layer 306, the second planarization layer 307, the pixel definition layer 308 and the spacer layer 309; in a case where the first metal layer 23 is the first source-drain metal layer 318, the first insulating layer 24 may be at least one of the first planarization layer 305, the passivation layer 306, the second planarization layer 307, the pixel definition layer 308 and the spacer layer 309; in a case where the first metal layer 23 is the second source-drain metal layer 317, the first insulating layer 24 may be at least one of the second planarization layer 307, the pixel definition layer 308 and the spacer layer 309.

As shown in FIG. 15, in these embodiments, the first metal layer 23 is the second source-drain metal layer 317, and the first insulating layer 24 is the second planarization layer 307.

The connection portions 15 and the first lapping holes 22 may be manufactured simultaneously with the film layer in which they are located during the manufacturing process of the display substrate 200, which may improve the production efficiency and save costs; moreover, the connection portions 15 and the first lapping holes 22 are located in the non-display area 12 of the display substrate 200, which may not be limited by the low-temperature process and may improve the product yield.

In addition, the connection portions 15 and the first lapping holes 22 are manufactured simultaneously in the manufacturing process of the display substrate 200, which is conducive to simplifying the manufacturing process of the touch structure 100, so that the touch device layer 9 in the touch structure 100 may be manufactured by a MASK process. Thus, it may be possible to improve the production efficiency and save costs, reduce the yield loss of normal processes, so as to greatly reduce the cost of products, and ensure product yields.

In some embodiments, the display substrate 200 further includes at least one dam structure, and the dam structure is located in the non-display area 12 and is a closed ring structure arranged around the display area 11. The organic encapsulation layer 312 is located on a side of the dam structure proximate to the display area 11, and the first inorganic encapsulation layer 311 and the second inorganic encapsulation layer 313 cover the dam structure. By providing the dam structure, during the process of forming the organic encapsulation layer 312, the dam structure may be used to block the material forming the organic encapsulation layer 312 to prevent the material from overflowing outside the area surrounded by the dam structure, thereby benefiting the reliability for the encapsulation.

For example, as shown in FIG. 15, in some of the embodiments of the present disclosure, the display substrate 200 includes a first dam 322 and a second dam 323. The first dam 322 is closer to the display area 11 than the second dam 323, and the second dam 323 is sleeved on an outside of the first dam 322. The plurality of connection portions 15 are disposed on a side of the second dam 323 away from the first dam 322, i.e., the side away from the display area 11.

In some embodiments, a width of a portion of the second trace line 52 connected to the connection portion 15 is substantially equal to a width of the connection portion 15, and is greater than a width of a portion of the second trace line 52 connected to the second touch electrode 201. With such the design, it is possible to reduce the resistance generated by connecting the second trace line 52 to the connection portion 15, which reduces the resistance of the second touch channel 2, thereby improving the transmission efficiency.

It will be noted that here, the term "substantially equal" includes a situation where the two are equal, and also includes a situation where they are not equal, but there is not much difference between the two, for example, the difference between the two and a ratio of the difference to either one is less than or equal to 0.1.

With reference to FIGS. 12 and 14, from the above description, it can be seen that for the flexible and bendable display substrate 200, the second region 122 further includes a bending region 1222 located between the fan-out region 1221 and the bonding region 1223, and the display substrate 200 may be bent and deformed in the bending region 1222. The touch device layer 9 includes the first trace lines 51 and the third trace lines 53 in the second peripheral region 42. In order to avoid reliability problems occurred between the first trace lines 51 and the third trace lines 53 in the bending region 1222, the portions of the first trace lines 51 and the third trace lines 53 corresponding to the bending region 1222 are transferred to trace lines in the metal layer in the display substrate 200. Here, the metal layer may be at least one of the gate metal layer 320, the first source-drain metal layer 318 and the second source-drain metal layer 317.

Some embodiments of the present disclosure provide another display panel, and the main difference between this display panel 300 and the display panel 300 in the above embodiments is the connection portions 15 and the second trace lines 52 and the third trace lines 53 connected to the connection portions 15.

Figure 16:
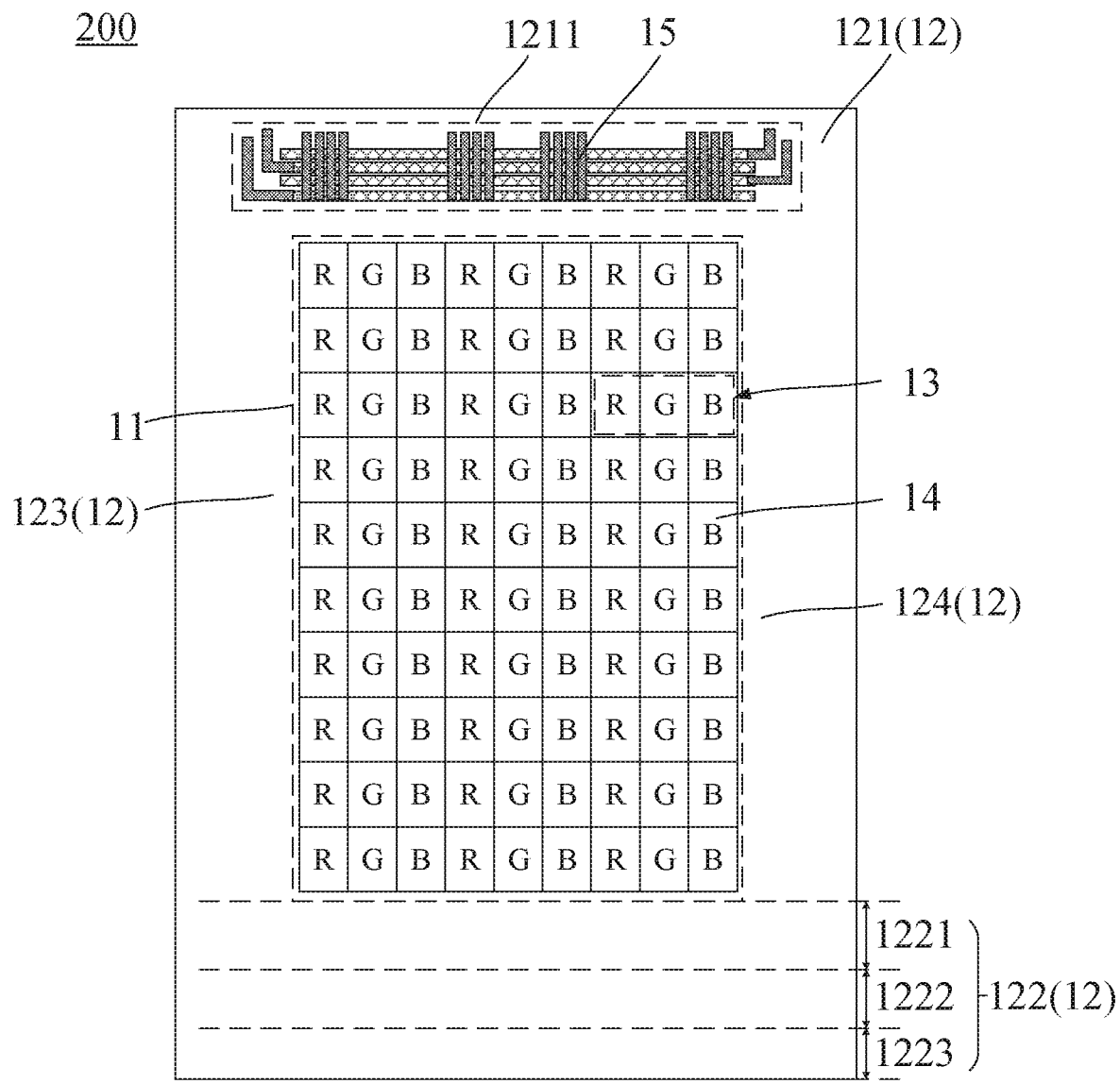
FIG. 16 is a top view of another display substrate, in accordance with some embodiments of the present disclosure.
Figure 17:
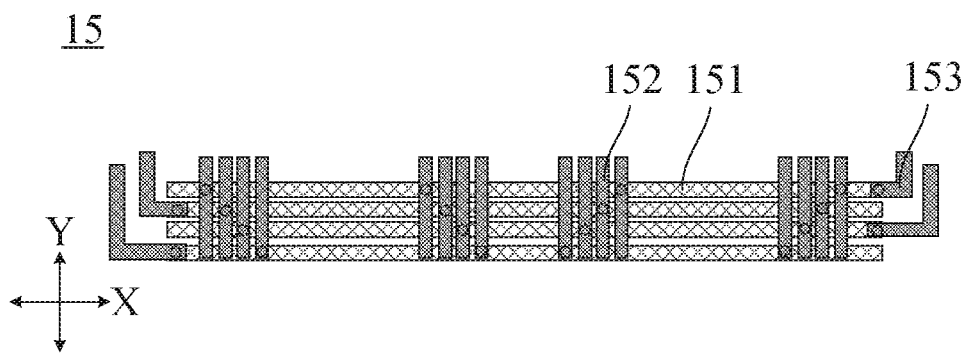
FIG. 17 is a structural diagram of multiple connection portions in FIG. 16.

FIG. 16 is a top view of another display substrate according to some embodiments of the present disclosure; FIG. 17 is a structural diagram of multiple connection portions in FIG. 16. As shown in FIGS. 16 and 17, the display substrate 200 is provided with a plurality of connection portions 15 in the first region 121; each connection portion 15 includes one first connection sub-portion 151 and a plurality of second connection sub-portions 152. The first connection sub-portion 151 is a conductor structure extending in the second direction X, and the second connection sub-portion 152 is a conductor structure extending in the first direction Y. The plurality of second connection sub-portions 152 in the connection portion 15 are all connected to the first connection sub-portion 151 and extend a direction far away from the display area 11 (i.e., in the first direction) from the connected first connection sub-portion 151.

For the plurality of connection portions 15 of the display substrate 200, the plurality of first connection sub-portions 151 are arranged side by side in the first direction Y, and all second connection sub-portions 152 are arranged side by side in the second direction X.

According to the above, the connection portions 15 in the display substrate 200 are used to connect the second touch channels 2 in the touch structure 100; the number of the connection portions 15 is equal to the number of the second touch channels 2 in the touch area 3, and the connection portions 15 are in one-to-one correspondence with the second touch channels 2.

Figure 18:
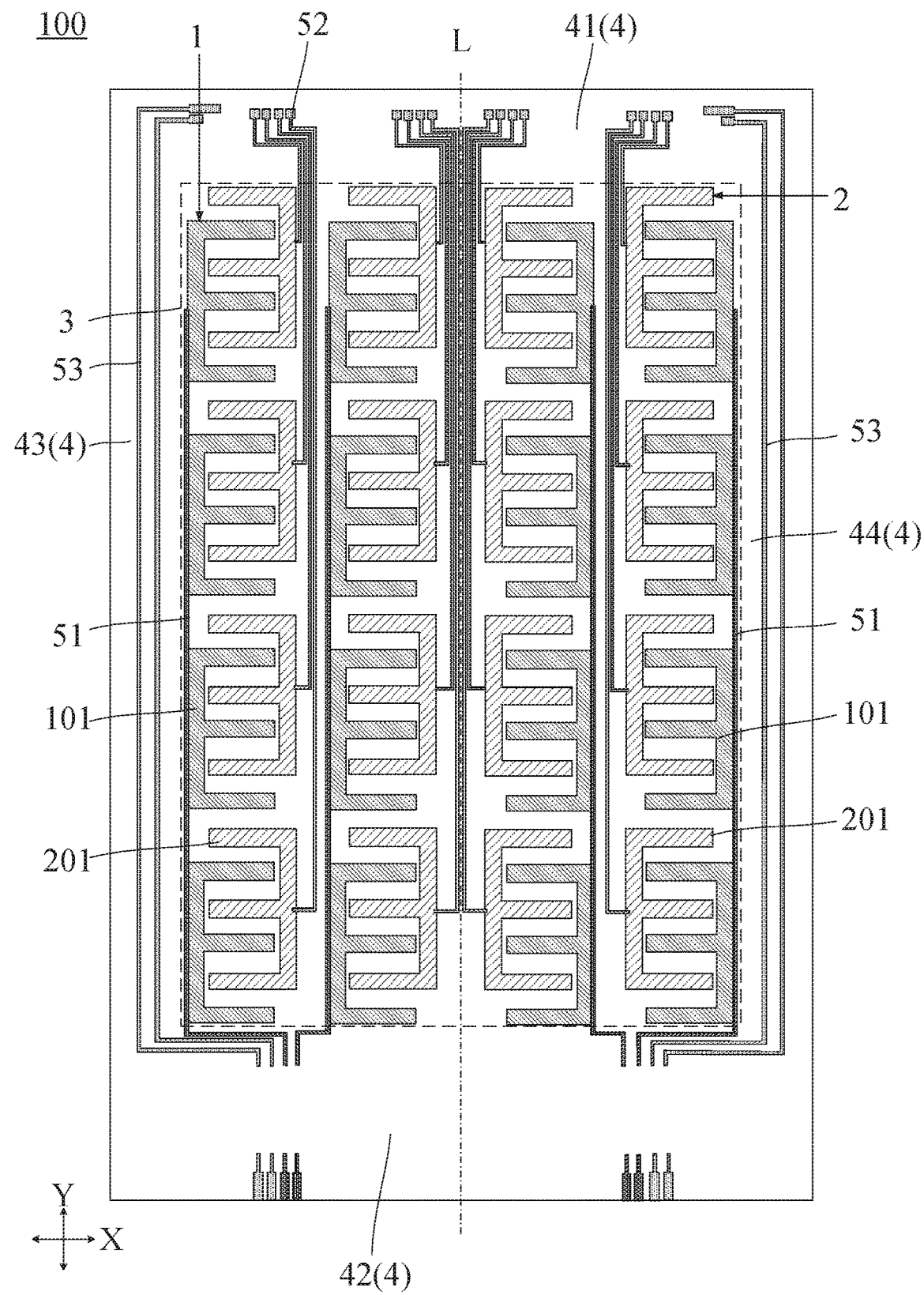
FIG. 18 is a top view of another touch structure, in accordance with some embodiments of the present disclosure.
Figure 19:
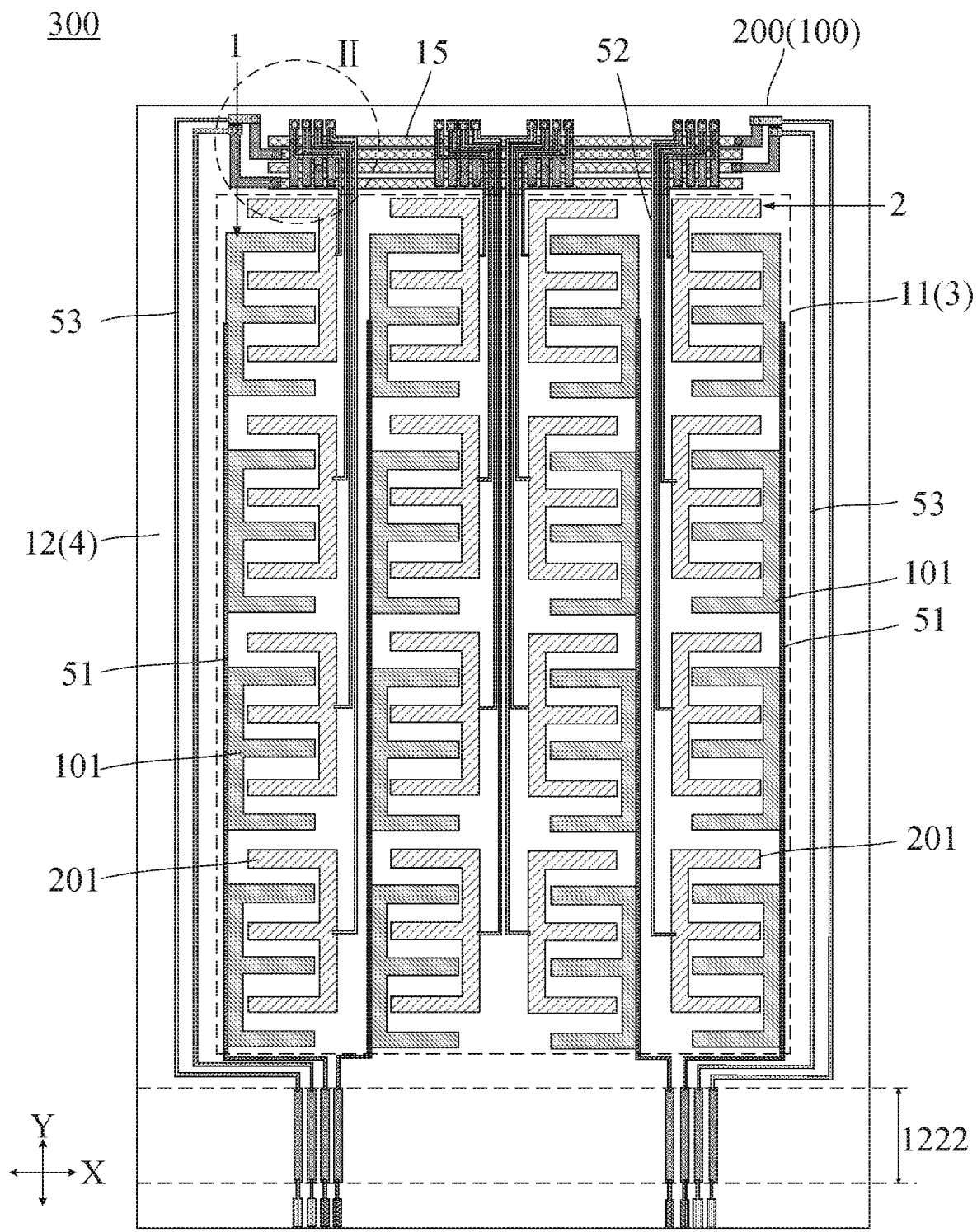
FIG. 19 is a top view of another display panel, in accordance with some embodiments of the present disclosure.
Figure 20:
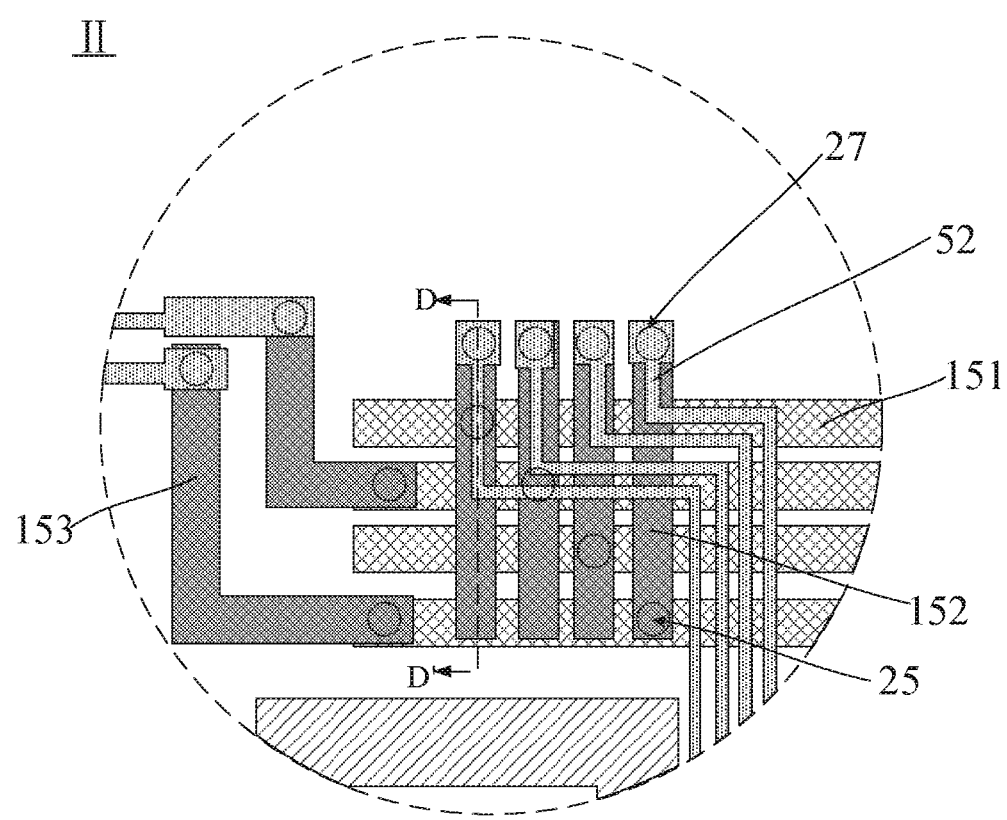
FIG. 20 is an partial enlarged view of the II region in FIG. 19.

FIG. 18 is a top view of another touch structure according to some embodiments of the present disclosure; FIG. 19 is a top view of another display panel according to some embodiments of the present disclosure; FIG. 20 is a partial enlarged view of the region II in FIG. 19. With reference to FIGS. 18 to 20, the plurality of second touch electrodes 201 in the second touch channel 2 are connected to the same connection portion 15 through the respective second trace lines 52. The second connection sub-portion 152 in the connection portion 15 is used to connect to a second trace line 52, and the number of second connection sub-portions 152 of a connection portion 15 is equal to the number of second touch electrodes 201 in a corresponding second touch channel 2. The plurality of second touch electrodes 201 in the second touch channel 2 are connected to the same first connection sub-portion 151 through the second trace lines 52 and the second connection sub-portions 152 to achieve the conduction of the second touch channel 2.

Figure 21:
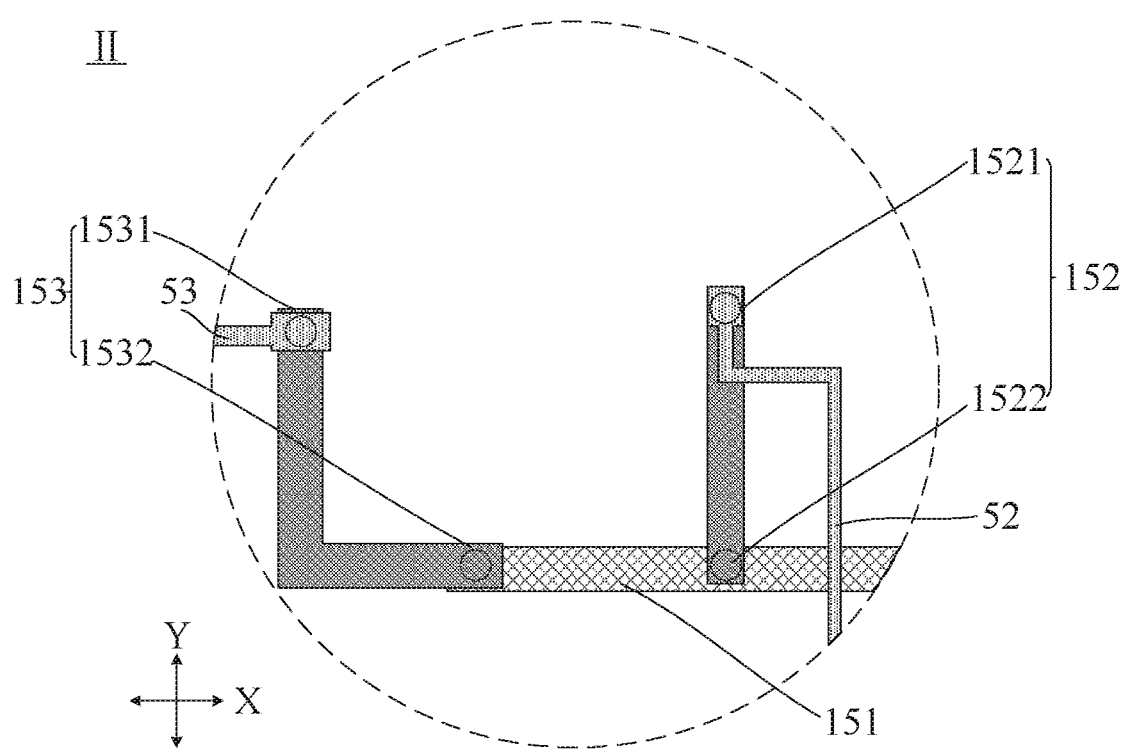
FIG. 21 is a structural diagram of a connection portion in FIG. 20.

FIG. 21 is a structural diagram of the connection portion in FIG. 20. As shown in FIG. 21, for the second connection sub-portion 152, a portion connected to the second trace line 52 is a first portion 1521, and a portion connected to the first connection sub-portion 151 is a second portion 1522. In the first direction Y, the first portion 1521 is farther away from the display area 11 than the second portion 1522.

Figure 22:
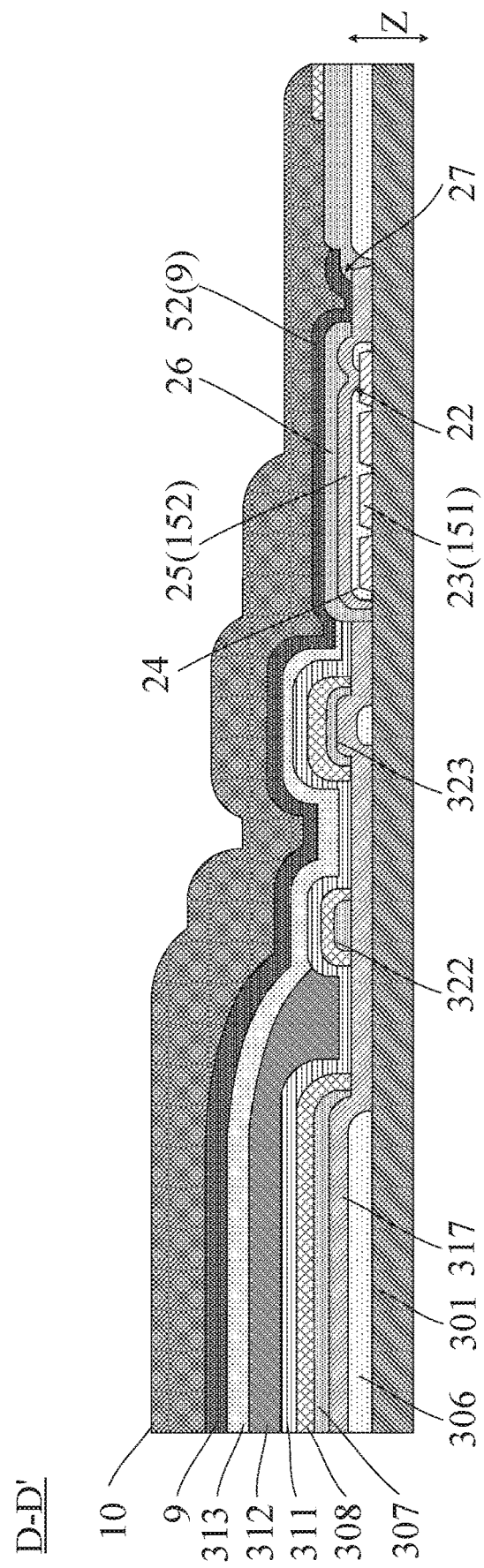
FIG. 22 is a sectional view taken along the line D-D' in FIG. 20.

FIG. 22 is a sectional view along the D-D' line in FIG. 20. With reference to FIGS. 14 and 22, in terms of film layer structure, the display substrate 200 includes a base substrate 301, and a first metal layer 23, a first insulation layer 24, a second metal layer 25 and a second insulation layer 26 that are stacked between the base substrate 301 and the touch structure 100.

The first connection sub-portion 151 is located in the first metal layer 23, and the second connection sub-portion 152 is located in the second metal layer 25; the first insulating layer 24 has a first lapping hole 22 exposing the first connection sub-portion 151, and the second connection sub-portion 152 is connected to the first connection sub-portion 151 through the first lapping hole 22. The second insulation layer 26 has a second lapping hole 27 exposing the second connection sub-portion 152, and the second trace line 52 is connected to the second connection sub-portion 152 through the second lapping hole 27.

It can be seen from the above description, the metal layers in the display substrate 200 include the gate metal layer 320, the first source-drain metal layer 318, and the second source-drain metal layer 317; the first metal layer 23 and the second metal layer 25 are any two of the gate metal layer 320, the first source-drain metal layer 318 and the second source-drain metal layer 317. The first insulating layer 24 is an insulating layer between the first metal layer 23 and the second metal layer 25, and the second insulating layer 26 is an insulating layer on a side of the second metal layer 25 away from the base substrate 301.

For example, the first metal layer 23 and the second metal layer 25 may be the first source-drain metal layer 318 and the second source-drain metal layer 317, respectively; the first insulating layer 24 is the first planarization layer 305, and the second insulating layer 26 is the second planarization layer 307.

The first connection sub-portion 151, the second connection sub-portion 152, the first lapping hole 22 and the second lapping hole 27 may be made simultaneously with the film layer in which they are located during the manufacturing process of the display substrate 200, which may improve the production efficiency and save costs; moreover, the first connection sub-portion 151, the second connection sub-portion 152, the first lapping hole 22 and the second lapping hole 27 are located in the non-display area 12 of the display substrate 200, which may not be limited by the low-temperature process and improve the product yield.

In addition, The first connection sub-portion 151, the second connection sub-portion 152, the first lapping hole 22 and the second lapping hole 27 may be made simultaneously in the manufacturing process of the display substrate 200, which is conducive to simplifying the manufacturing process of the touch structure 100, so that the touch device layer 9 in the touch structure 100 may be manufactured by a MASK process. Thus, it may be possible to improve the production efficiency and save costs, reduce the yield loss of normal processes, so as to greatly reduce the cost of products, and ensure the product yield.

In some embodiments, the plurality of first portions 1521 of the plurality of connection portions 15 are aligned in the first direction Y. That is, the connection positions of the connection portion 15 and the second trace lines 52 are at the same position in the first direction Y, thereby facilitating the connection between the second traces 52 and the connection portion 15.

It can be seen from the above description, the display substrate 200 includes the base substrate 301 and the thin film encapsulation layer 310 located on the base substrate 301; the touch structure 100 is disposed on a side of the thin film encapsulation layer 310 away from the base substrate 301.

Since the thin film encapsulation layer 310 cannot be punched, the lapping holes in the display substrate 200 that expose the connection portion 15 and allow the second trace lines 52 to connect to the connection portion 15 may usually only be punched outside the coverage region of the thin film encapsulation layer 310. In some of the embodiments of the present disclosure, the connection portion 15 adopts a design including a first connection sub-portion 151 and second connection sub-portions 152, so that part of the structure of the connection portion 15 may be retracted to the coverage region of the film encapsulation layer 310, and the second lapping hole 27 used to connect the second trace lines 52 to the connection portion 15 may be arranged close to an edge of the coverage region of the film encapsulation layer 310. Thus, it is possible to reduce the width of the frame occupied by the connection portion 15, which is beneficial to achieving a narrow bezel design.

Figure 23:
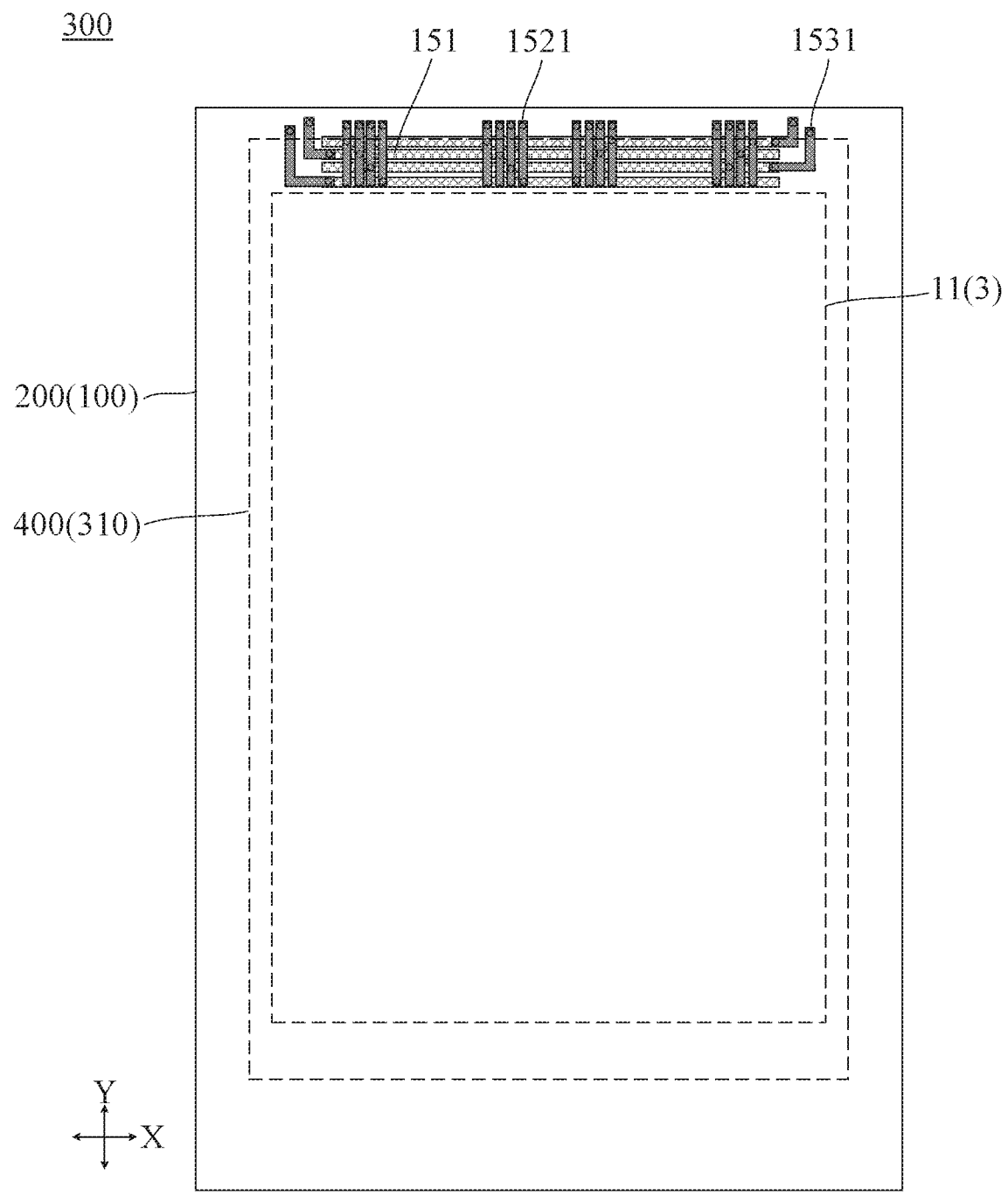
FIG. 23 is a top view of a connection portion and a film encapsulation layer in FIG. 19.

FIG. 23 is a top view of the connection portion and the thin film encapsulation layer in FIG. 19, an area designated by the reference sign 400 in this figure is the coverage region of the thin film encapsulation layer 310. As shown in FIG. 23, for example, in some embodiments, for the orthographic projections on the base substrate 301, at least one first connection sub-portion 151 overlaps with the film encapsulation layer 310, and all the first portions 1521 of the plurality of connection portions 15 are non-overlapping with the film encapsulation layer 310.

With such the design, at least one first connection sub-portion 151 of the connection portion 15 is located in the coverage region 400 of the thin film encapsulation layer 310, thereby reducing the width of the frame occupied by the connection portion 15 and facilitating the achievement of the narrow bezel design.

In some embodiments, as shown in FIGS. 20 and 21, the connection portion 15 further includes a third connection sub-portion 153 connected to the first connection sub-portion 151, and the third connection sub-portion 153 is connected to the third trace line 53. The third connection sub-portion 153 is in a different layer from the first connection sub-portion 151; the third connection sub-portion 153 may be in the same layer as or in a different layer from the second connection sub-portion 152.

For the third connection sub-portion 153, a portion connected to the third trace line 53 is a third portion 1531, and a portion connected to the first connection sub-portion 151 is a fourth portion 1532; the third portion 1531 is farther away from the display area 11 than the fourth portion 1532 in the first direction Y. With such the design, part of the structure of the connection portion 15 may be retracted to the coverage region 400 of the film encapsulation layer 310, thereby reducing the width of the frame occupied by the connection portion 15 and facilitating the achievement of the narrow bezel design.

As shown in FIG. 23, for example, for the orthographic projections on the base substrate 301, at least one first connection sub-portion 151 overlaps with the thin film encapsulation layer 310, and the plurality of third portions 1531 of the plurality of connection portions 15 are all non-overlapping with the thin film encapsulation layer 310.

In some embodiments, a width of the first connection sub-portion 151 is substantially equal to a width of the second connection sub-portion 152. The width of the portion of the second trace line 52 connected to the second connection sub-portion 152 is substantially equal to the width of the second connection sub-portion 152, and is greater than the width of the portion of the second trace line 52 connected to the second touch electrode 201. With such the design, it is possible to reduce the resistance generated by connecting the second trace line 52 to the connection portion 15, which reduces the resistance of the second touch channel 2, thereby improving the transmission efficiency.

It will be noted that here, the term "substantially equal" includes a situation where the two are equal, and also includes a situation where they are not equal, but there is not much difference between the two, for example, the difference between the two and a ratio of the difference to either one is less than or equal to 0.1.

In the above embodiments, the extension direction of the first touch channel 1 is parallel to the extension direction of the data signal line 17, the connection portions 15 are located in the first region 121 of the display substrate 200, and the bonding region 1223 is located in the second region 122 of the display substrate 200, and the display panel provided in the embodiments of the present disclosure is not limited thereto.

For example, in a possible implementation, the connection portions 15 may be disposed in the second region 122.

In another possible implementation, the extension direction of the first touch channel 1 is parallel to the extension direction of the scan signal line 16. In this case, the connection portions 15 may be disposed in the third region 123 and/or the fourth region 124 of the display substrate 200.

In yet another possible implementation, the extension direction of the first touch channel 1 is inclined relative to the extension direction of the scan signal line 16, here, the "inclined" means that the two are not perpendicular and parallel to each other; the connection portions 15 are disposed a region of the display substrate 200 corresponding to an end of the first touch channel 1.

Figure 24:
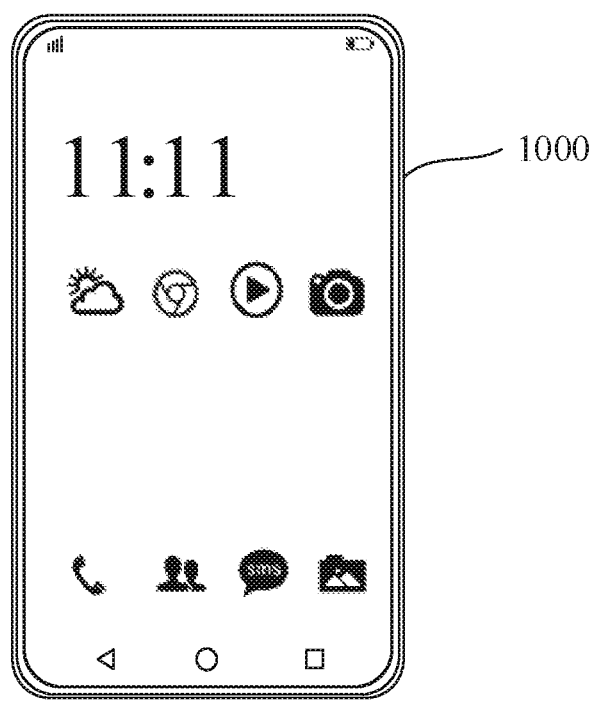
FIG. 24 is a schematic diagram of an electronic apparatus, in accordance with some embodiments.

As shown in FIG. 24, the embodiments of the present disclosure provide a display apparatus with the display panel in the above embodiments. The display apparatus 1000 is a product having a function of displaying images (including an image in stationary or an image in motion (which may be a video)). For example, the display apparatus may be any of a display, a mobile phone, a laptop, a tablet, a personal wearable device, a billboard, a digital photo frame, an e-reader, and the like.

The display apparatus 1000 has the same structure and beneficial effects as the display panel provided in the above embodiments, which will not be detailed here.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display panel, comprising:
a display substrate having a display area and a non-display area located on a periphery of the display area; and
a touch structure disposed on the display substrate;
wherein the display substrate includes a plurality of connection portions located in the non-display area;
the touch structure includes a plurality of first touch channels, a plurality of second touch channels, a plurality of first trace lines and a plurality of second trace lines; a first touch channel includes a plurality of first touch electrodes arranged in a first direction, and a second touch channel includes a plurality of second touch electrodes arranged in a second direction; the first direction is perpendicular to the second direction;
the plurality of first touch electrodes in the first touch channel are connected through a first trace line; and
the plurality of second touch electrodes in the second touch channel are connected to a same connection portion through respective second trace lines;
wherein the non-display area includes a fan-out region and a bonding region, and the bonding region is farther away from the display area than the fan-out region;
an end of the first trace line is connected to the first touch channel, and another end extends to the bonding region through the fan-out region; and the touch structure further includes a plurality of third trace lines, an end of the third trace line is connected to a connecting portion, and another end extends to the bonding region through the fan-out region.

2. The display panel according to claim 1, wherein the non-display area includes a first region and a second region located on two sides of the display area in the first direction, and the plurality of connection portions are located in the first region and/or the second region.

3. The display panel according to claim 2, wherein the second region includes a fan-out region; the plurality of connection portions are located in the first region.

4. The display panel according to claim 1, wherein the plurality of connection portions each extend in the second direction, and the plurality of connection portions are arranged side by side in the first direction.

5. The display panel according to claim 4, wherein the display substrate includes:
   a base substrate;
   a first metal layer disposed between the base substrate and the touch structure; and
   a first insulation layer disposed between the first metal layer and the touch structure;
   wherein the plurality of connection portions are located in the first metal layer, the first insulating layer has first lapping holes exposing the plurality of connection portions, a second trace line is connected to a connection portion through a first lapping hole.

6. The display panel according to claim 4, wherein a width of a portion of a second trace line connected to a connection portion is substantially equal to a width of the connection portion, and greater than a width of a portion of the second trace line connected to a second touch electrode; and/or
   the number of the plurality of connection portions is equal to the number of the plurality of second touch channels.

7. The display panel according to claim 1, wherein a connection portion of the plurality of connection portions includes a first connection sub-portion and a plurality of second connection sub-portions, and the first connection sub-portion is located in a different layer from the plurality of second connection sub-portions; and
   the plurality of second connection sub-portions are connected to the first connection sub-portion, and each second connection sub-portion is further connected to a second trace line.

8. The display panel according to claim 7, wherein the first connection sub-portion is arranged in the second direction, and the second connection sub-portion is arranged in the first direction;
   a plurality of the first connection sub-portions of the plurality of connection portions are arranged side by side in the first direction, and second sub-connection portions of the plurality of connection portions are arranged side by side in the second direction.

9. The display panel according to claim 7, wherein for the second connection sub-portion, a portion connected to the second trace line is a first portion, and a portion connected to the first sub-connection portion is a second portion; and in the first direction, the first portion is further away from the display area than the second portion; or
   for the second connection sub-portion, a portion connected to the second trace line is a first portion, and a portion connected to the first sub-connection portion is a second portion; and in the first direction, the first portion is further away from the display area than the second portion; a plurality of first portions of the plurality of connection portions are aligned in the first direction.

10. The display panel according to claim 7, wherein the display substrate further includes a base substrate and a thin film encapsulation layer located on the base substrate; the touch structure is disposed on a side of the thin film encapsulation layer away from the base substrate; wherein a portion of the second connection sub-portion connected to the second trace line is a first portion; for orthographic projections on the base substrate, at least one first connection sub-portion overlaps the thin film encapsulation layer, and first portions of the plurality of connection portions are non-overlapping with the thin film encapsulation layer; and/or
   the display substrate includes: a base substrate; and a first metal layer, a first insulation layer, a second metal layer and a second insulation layer that are stacked between the base substrate and the touch structure; wherein the first connection sub-portion is located in the first metal layer, and the second connection sub-portions are located in the second metal layer; the first insulating layer has first lapping holes exposing the first connection sub-portion, and the second insulating layer has second lapping holes exposing the second connection sub-portions; and the second connection sub-portion is connected to the first connection sub-portion through a first lapping hole, and the second trace line is connected to the second connection sub-portion through a second lapping hole.

11. The display panel according to claim 7, wherein a width of the first connection sub-portion is substantially equal to a width of the second connection sub-portion; a width of a portion of the second trace line connected to the second connection sub-portion is substantially equal to the width of the second connection sub-portion, and is greater than a width of a portion of the second trace line connected to a second touch electrode; and/or
   the number of the plurality of connection portions is the same as the number of the plurality of second touch channels; the number of second connection sub-portions in a connection portion is equal to the number of second touch electrodes in a corresponding second touch channel.

12. The display panel according to claim 1, wherein the connection portion includes a first connection sub-portion and a plurality of second connection sub-portions, and the first connection sub-portion is located in a different layer from the plurality of second connection sub-portions, the plurality of second connection sub-portions are all connected to the first connection sub-portion; each second connection sub-portion is further connected to a second trace line,
   the connection portion further includes a third connection sub-portion connected to the first connection sub-portion, and the third connection sub-portion is located in a different layer from the first connection sub-portion; and
   each third connection sub-portion is further connected to a third trace line.

13. The display panel according to claim 12, wherein for the third connection sub-portion, a portion connected to the third trace line is a third portion, and a portion connected to the first connection sub-portion is a fourth portion; in the first direction, the third portion is farther from the display area than the fourth portion; or for the third connection sub-portion, a portion connected to the third trace line is a third portion, and a portion connected to the first connection sub-portion is a fourth portion; in the first direction, the third portion is farther from the display area than the fourth portion; the display substrate includes a base substrate and a thin film encapsulation layer located on the base substrate; the touch structure is disposed on a side of the thin film encapsulation layer away from the base substrate; for orthographic projections on the base substrate, at least one first connection sub-portion overlaps with the thin film encapsulation layer, and third portions of the plurality of connection portions are all non-overlapping with the thin film encapsulation layer.

14. The display panel according to claim 1, wherein the plurality of first touch channels, the plurality of second touch channels, the plurality of first trace lines, the plurality of second trace lines and the plurality of third trace lines are arranged in a same layer.

15. A display apparatus, comprising the display panel according to claim 1.

16. A display panel, comprising:
a display substrate having a display area and a non-display area located on a periphery of the display area; and
a touch structure disposed on the display substrate;
wherein the display substrate includes a plurality of connection portions located in the non-display area;
the touch structure includes a plurality of first touch channels, a plurality of second touch channels, a plurality of first trace lines and a plurality of second trace lines; a first touch channel includes a plurality of first touch electrodes arranged in a first direction, and a second touch channel includes a plurality of second touch electrodes arranged in a second direction; the first direction is perpendicular to the second direction;
the plurality of first touch electrodes in the first touch channel are connected through a first trace line; and
the plurality of second touch electrodes in the second touch channel are connected to a same connection portion through respective second trace lines;
wherein the touch structure includes a touch device layer and a touch protective layer, and the touch device layer includes the plurality of first touch channels, the plurality of second touch channels, the plurality of first trace lines, the plurality of second trace lines that are located in a same layer; the touch protective layer is further away from the display substrate than the touch device layer; and/or the touch structure includes a plurality of first line groups, the number of the first line groups is equal to the number of the connection portions, each first line group includes second trace lines, and a plurality of second touch electrodes connected to the second trace lines belong to a same second touch channel.

17. The display panel according to claim 1, wherein a first touch electrode of the plurality of first touch electrodes and a second touch electrode of the plurality of second touch electrodes are arranged in pairs; second touch electrodes paired with the plurality of first touch electrodes in the first touch channel are arranged into a first electrode group; the second touch electrodes in the first electrode group are located in a same side of the corresponding first touch channel.

18. The display panel according to claim 17, wherein the touch structure includes a plurality of second trace groups, each second trace group includes second trace lines, and second touch electrodes connected to the second trace lines belong to a same first electrode group; the second trace lines in the second trace group are arranged on a same side of the first electrode group; and/or the first touch channel and the first electrode group that are arranged in pairs are arranged into a second electrode group; a first trace line and second trace lines that are connected to the second electrode group are respectively located on two sides of the second electrode group.

19. The display panel according to claim 18, wherein the touch structure includes first touch channels and first electrode groups;
with respect to a center line of symmetry parallel to the first direction, the first touch channels are arranged symmetrically, and the first electrode groups are arranged symmetrically.

* * * * *